United States Patent
Durham et al.

(10) Patent No.: US 11,010,310 B2
(45) Date of Patent: *May 18, 2021

(54) CONVOLUTIONAL MEMORY INTEGRITY

(71) Applicant: Intel Corporation, Santa Clara, CA (US)

(72) Inventors: David M. Durham, Beaverton, OR (US); Siddhartha Chhabra, Hillsboro, OR (US); Michael E. Kounavis, Portland, OR (US); Sergej Deutsch, Hillsboro, OR (US); Karanvir S. Grewal, Hillsboro, OR (US); Joseph F. Cihula, Hillsboro, OR (US); Saeedeh Komijani, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,067

(22) Filed: Jan. 30, 2020

(65) Prior Publication Data

US 2020/0278937 A1    Sep. 3, 2020

Related U.S. Application Data

(63) Continuation of application No. 15/089,140, filed on Apr. 1, 2016, now Pat. No. 10,585,809.

(51) Int. Cl.
| | | |
|---|---|---|
| *G06F 12/14* | (2006.01) | |
| *G06F 21/64* | (2013.01) | |
| *G06F 21/79* | (2013.01) | |

(52) U.S. Cl.
CPC .......... *G06F 12/1408* (2013.01); *G06F 21/64* (2013.01); *G06F 21/79* (2013.01); *G06F 2212/60* (2013.01)

(58) Field of Classification Search
CPC ...... G06F 12/1408; G06F 21/64; G06F 21/79; G06F 2212/60
See application file for complete search history.

(56) References Cited

U.S. PATENT DOCUMENTS 5,943,283 A * 8/1999 Wong .................. G06F 12/1408
                                            365/221
6,115,394 A    9/2000 Balachandran et al.
(Continued)

OTHER PUBLICATIONS

Non-Final Office Action for U.S. Appl. No. 15/089,140, dated Jun. 4, 2019, 19 pages.
(Continued)

*Primary Examiner* — Aravind K Moorthy
(74) *Attorney, Agent, or Firm* — Jordan IP Law, LLC

(57) ABSTRACT

Apparatus, systems, computer readable storage mediums and/or methods may provide memory integrity by using unused physical address bits (or other metadata passed through cache) to manipulate cryptographic memory integrity values, allowing software memory allocation routines to control the assignment of pointers (e.g., implement one or more access control policies). Unused address bits (e.g., because of insufficient external memory) passed through cache, may encode key domain information in the address so that different key domain addresses alias to the same physical memory location. Accordingly, by mixing virtual memory mappings and cache line granularity aliasing, any page in memory may contain a different set of aliases at the cache line level and be non-deterministic to an adversary.

25 Claims, 10 Drawing Sheets

(56) References Cited

U.S. PATENT DOCUMENTS

| | | | |
|---|---|---|---|
| 6,477,676 B1* | 11/2002 | Rhodes | G01R 31/318307 711/206 |
| 6,996,559 B1* | 2/2006 | Beshai | H04L 29/12009 |
| 7,873,837 B1* | 1/2011 | Lee | G07C 9/257 713/189 |
| 8,782,434 B1* | 7/2014 | Ghose | G06F 21/51 713/190 |
| 10,585,809 B2* | 3/2020 | Durham | G06F 21/64 |
| 2007/0143568 A1* | 6/2007 | Gould | G06F 12/0646 711/203 |
| 2007/0157003 A1 | 7/2007 | Durham et al. | |
| 2008/0059729 A1 | 3/2008 | Norberg et al. | |
| 2008/0109660 A1 | 5/2008 | Mitra | |
| 2009/0204972 A1 | 8/2009 | Brice et al. | |
| 2010/0011252 A1* | 1/2010 | Rivoir | G11C 29/56008 714/32 |
| 2010/0332850 A1* | 12/2010 | Boivie | G06F 21/72 713/189 |
| 2011/0078359 A1* | 3/2011 | Van Dyke | G06F 12/10 711/5 |
| 2011/0293097 A1* | 12/2011 | Maino | G06F 12/0811 380/279 |
| 2011/0296201 A1* | 12/2011 | Monclus | H04L 9/0894 713/190 |
| 2012/0079283 A1* | 3/2012 | Hashimoto | G06F 12/1425 713/189 |
| 2012/0079285 A1 | 3/2012 | Gueron et al. | |
| 2013/0067245 A1* | 3/2013 | Horovitz | G06F 21/57 713/193 |
| 2014/0019686 A1* | 1/2014 | Dong | G06F 12/0864 711/128 |
| 2014/0059333 A1* | 2/2014 | Dixon | G06F 13/1673 712/244 |
| 2014/0101461 A1* | 4/2014 | Chhabra | G06F 21/71 713/193 |
| 2014/0208109 A1 | 7/2014 | Narendra Trivedi et al. | |
| 2014/0237261 A1* | 8/2014 | Diep | G06F 12/1408 713/189 |
| 2015/0036486 A1 | 2/2015 | McMurry et al. | |
| 2015/0089173 A1* | 3/2015 | Chhabra | G06F 9/45558 711/163 |
| 2015/0161059 A1 | 6/2015 | Durham et al. | |
| 2015/0212951 A1 | 7/2015 | Franceschini et al. | |
| 2015/0256516 A1 | 9/2015 | Martini et al. | |
| 2015/0294123 A1 | 10/2015 | Oxford | |
| 2016/0055095 A1* | 2/2016 | Faraboschi | G06F 3/061 711/118 |
| 2016/0103626 A1* | 4/2016 | Hars | G06F 21/556 711/103 |
| 2016/0154663 A1* | 6/2016 | Guthrie | G06F 11/1458 718/1 |
| 2016/0170881 A1* | 6/2016 | Guthrie | G06F 9/45558 711/143 |
| 2016/0188243 A1* | 6/2016 | Dementiev | G06F 21/79 711/163 |
| 2016/0188874 A1* | 6/2016 | Oxford | G06F 21/64 726/22 |
| 2016/0203085 A1* | 7/2016 | Kranich | G06F 12/0877 713/2 |
| 2016/0283750 A1* | 9/2016 | Durham | G06F 21/79 |
| 2016/0291891 A1 | 10/2016 | Cheriton | |
| 2016/0335201 A1* | 11/2016 | Lea | G06F 21/71 |
| 2017/0010982 A1* | 1/2017 | Avanzi | G06F 12/0802 |
| 2017/0083724 A1* | 3/2017 | Chhabra | G06F 12/1408 |
| 2017/0090800 A1* | 3/2017 | Alexandrovich | G06F 3/0673 |
| 2017/0091119 A1 | 3/2017 | Chhabra et al. | |
| 2017/0169255 A1* | 6/2017 | Lin | G06F 12/14 |
| 2017/0185529 A1 | 6/2017 | Chhabra et al. | |
| 2017/0185532 A1* | 6/2017 | Durham | G06F 21/00 |
| 2017/0199679 A1* | 7/2017 | Patocka | G06F 12/0877 |
| 2017/0201503 A1 | 7/2017 | Jayasena et al. | |
| 2017/0286297 A1* | 10/2017 | Voigt | G06F 12/08 |
| 2017/0286320 A1 | 10/2017 | Chhabra et al. | |
| 2018/0137062 A1* | 5/2018 | Awad | G06F 12/0802 |
| 2018/0165225 A1 | 6/2018 | Horne et al. | |
| 2018/0217941 A1 | 8/2018 | Horovitz et al. | |

OTHER PUBLICATIONS

Notice of Allowance for U.S. Appl. No. 15/089,140, dated Oct. 31, 2019, 8 pages.

* cited by examiner

CONVOLUTIONAL MEMORY INTEGRITY

CROSS-REFERENCE TO RELATED APPLICATIONS

This application claims the benefit of priority to U.S. patent application Ser. No. 15/089,140 filed Apr. 1, 2016.

TECHNICAL FIELD

Embodiments generally relate to memory integrity. More particularly, embodiments relate to the encryption, decryption, generation and use of integrity values, and/or the generation and use of a key or a tweak to provide memory integrity.

BACKGROUND

Encryption of memory in a device, such as a personal computer, a smart mobile phone, etc., may be used to protect data stored in the memory when the device is operating, lost, stolen, etc. Encryption of the memory may, however, remain vulnerable since the data may be corrupted by an adversary via an initial and/or a repeated memory corruption attack. Moreover, data stored in the memory may become corrupt as a result of normal operation and/or the passage of time. Thus, a processor may execute corrupt data and cause an array of undesirable effects such as, for example, a password login attempt to erroneously succeed, fail, etc., an application to misbehave, crash, etc., the device to misbehave, crash, etc.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
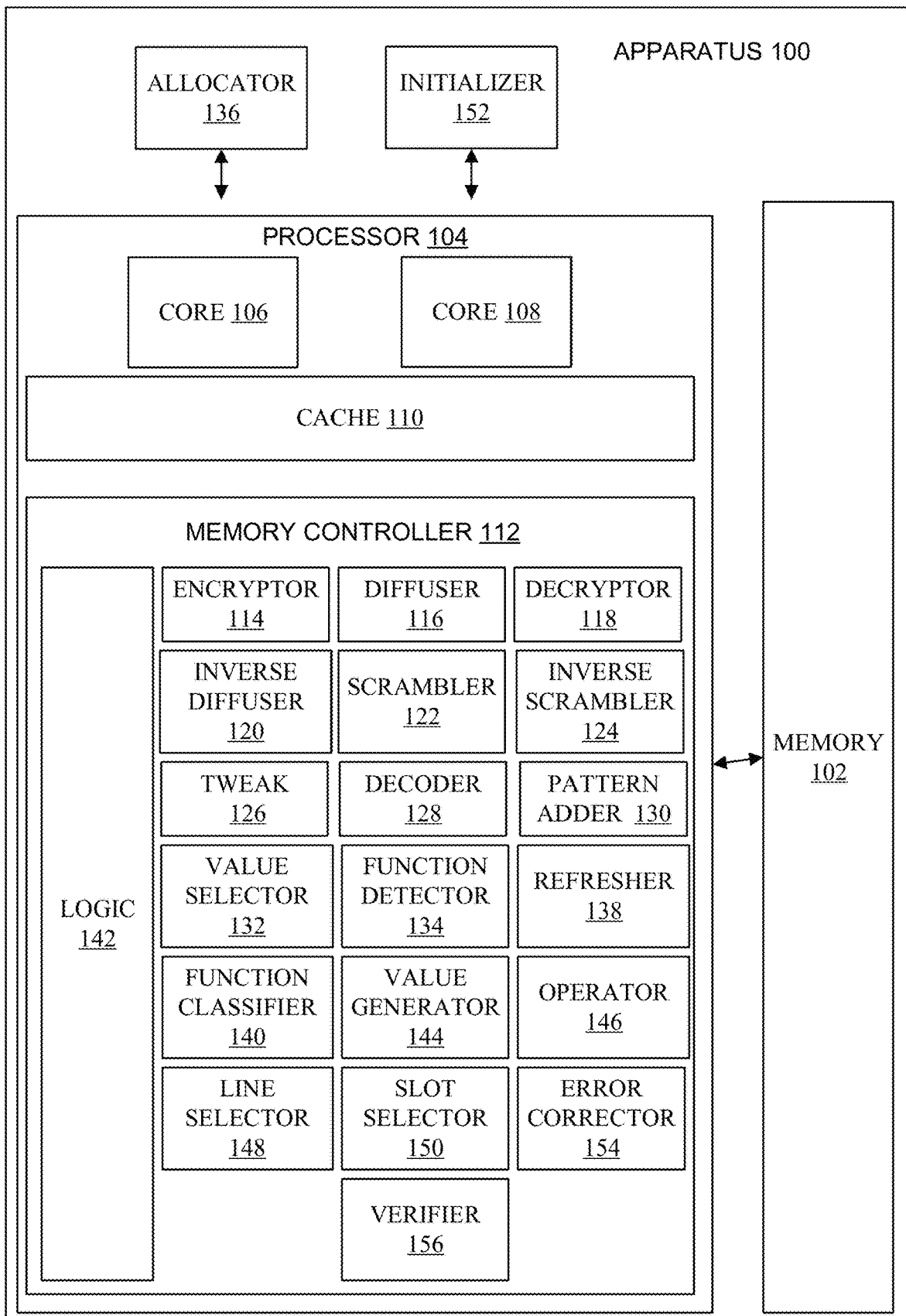
FIG. 1 is block diagram of an example of an apparatus to maintain memory integrity according to an embodiment.

Turning now to FIG. 1, the illustrated apparatus 100 provides memory integrity according to an embodiment by using unused physical address bits (or other metadata passed through cache) to manipulate cryptographic memory integrity values, allowing software memory allocation routines to control the assignment of pointers (e.g., implement one or more access control policies). Unused address bits (e.g., because of insufficient external memory) passed through cache, may encode key domain information in the address so that different key domain addresses alias to the same physical memory location. Accordingly, by mixing virtual memory mappings and cache line granularity aliasing, any page in memory may contain a different set of aliases at the cache line level and be non-deterministic to an adversary.

The illustrated apparatus 100 may include any computing device and/or data platform such as a laptop, personal digital assistant (PDA), media content player, imaging device, mobile Internet device (MID), any smart device such as a wireless smart phone, smart tablet, smart TV, computer server, wearable device, and so on, or combinations thereof.

The illustrated apparatus 100 includes a memory 102. The memory 102 may be external to a processor 104 (e.g., external memory), and/or may be coupled to the processor 104 by, for example, a memory bus. In addition, the memory 102 may be implemented as main memory. The memory 102 may include, for example, volatile memory, non-volatile memory, and so on, or combinations thereof. For example, the memory 102 may include dynamic random access memory (DRAM) configured as one or more memory modules such as, for example, dual inline memory modules (DIMMs), small outline DIMMs (SODIMMs), etc., read-only memory (ROM) (e.g., programmable read-only memory (PROM), erasable PROM (EPROM), electrically EPROM (EEPROM), etc.), phase change memory (PCM), and so on, or combinations thereof. The memory 102 may include an array of memory cells arranged in rows and columns, partitioned into independently addressable storage locations.

Thus, access to the memory 102 may involve using an address for a storage location such as, for example, a row address identifying the row containing the storage memory location and a column address identifying the column containing the storage memory location. In addition, a device internal to the apparatus 100 and/or a device external to the apparatus 100 may accomplish access to the memory 102. In one example, access to the memory 102 may include an input/output (I/O) device, an accelerator, and so on. Access to the memory 102 may involve, for example, direct memory access (DMA).

The processor 104 may include any type of processor such as, for example, a micro-processor, an embedded processor, a digital signal processor (DSP), a central processing unit (CPU), a graphical processing unit (GPU), a visual processing unit (VPU), a network processor, a device to execute code to implement the technologies described herein, and so on, or combinations thereof. The processor 104 may include one or more cores such as, for example, a core 106 and a core 108. The cores 106, 108 may include a single-threaded core, a multithreaded core including more than one hardware thread context (or "logical processor") per core, and so on, or combinations thereof. The cores 106, 108 may include an instruction decoder to recognize and/or decode an instruction (e.g., from an instruction register), to activate appropriate circuitry to execute the instruction, to verify that a stream of instructions (e.g., operation codes, etc.) will compute, and so on, or combinations thereof.

For example, the cores 106, 108 may execute one or more instructions such as a read instruction, a write instruction, an erase instruction, a move instruction, an arithmetic instruction, a control instruction, and so on, or combinations thereof. The cores 106, 108 may, for example, execute one or more instructions to move data (e.g., program data, operation code, operand, etc.) between a register (not shown) and the memory 102, to read the data from the memory 102, to write the data to the memory 102, to perform an arithmetic operation using the data (e.g., add, subtract, bitwise operation, compare, etc.), to perform a control operation associated with the data (e.g., branch, etc.), and so on, or combinations thereof. The instructions may include any code representation such as, for example, binary code, octal code, and/or hexadecimal code (e.g., machine language), symbolic code (e.g., assembly language), decimal code, alphanumeric code, higher-level programming language code, and so on, or combinations thereof. Thus, for example, hexadecimal code may be used to represent an operation code (e.g., opcode) of an x86 instruction set including a byte value "00" for an add operation, a byte value "8B" for a move operation, a byte value "FF" for an increment/decrement operation, and so on.

The processor 104 may include internal storage such as, for example, a processor cache 110 including one or more levels. The processor cache 110 may not be encrypted and/or may share a same die as the processor 104, on the same chip. In addition, the processor cache 110 may be integrated onto one or more of the cores 106, 108. The illustrated processor cache 110, may store data (e.g., instructions, operands, program data, etc.) utilized by one or more components of the processor 104. The cache 110 may include any type of cache such as, for example, an instruction cache, a data cache, a single level cache, a multilevel cache, a shared cache, a strictly inclusive cache, an exclusive cache, and so on, or combinations thereof. For example, the cache 110 may include a mid-level cache, such as level 2 (L2), level 3 (L3), level 4 (L4), or other levels of cache, a last level cache (LLC), and so on, or combinations thereof. The cores 106, 108 may check whether data is located in the cache 110 to execute one or more instructions and/or other data (e.g., program data, etc.), wherein a cache miss may cause a transfer of the data from the memory 102 to the cache 110 in a block of fixed size (e.g., cache line).

The illustrated processor 104 also may include a memory controller 112, which may couple the processor 104 with the memory 102, manage the flow of data to and/or from the memory 102, and so on, or combinations thereof. While the memory controller 112 is illustrated as integrated onto the processor 104, the memory controller 112 may be discrete logic outside the processor 104 rather than integrated therein. Similarly, components illustrated as integrated onto the memory controller 112 may be discrete logic outside the memory controller 112 rather than integrated therein.

Each core 106, 18 may be, for example, coupled with respective memory via a respective memory controller, coupled with shared memory via a shared memory controller, coupled with respective memory via a shared memory controller, and so on, or combinations thereof. In addition, a shared cache may be coupled with a shared memory controller, a plurality of caches may be coupled with a plurality of respective memory controllers, and so on, and combinations thereof. For example, the memory controller 112 may be shared among the cores 106, 108, may be coupled with the cache 110 (e.g., shared multilevel cache), and may couple the cores 106, 108 with the memory 102 (e.g., shared DRAM). The memory controller 112 may be coupled with the memory 102 (e.g., external memory, DRAM, etc.), for example, via a memory bus. In addition, the memory controller 112 may be realized as a single, centralized, component in hardware, software or both, and/or realized through the interaction of one or more plurality of components, distributing the functionality of the memory controller 112 among the plurality of components.

The illustrated memory controller 112 may include an encryptor 114, which may encrypt unencrypted data. The unencrypted data may include, for example, cleartext data, plaintext data, and so on, or combinations thereof. The cleartext data may be subject to encoding in a special format (e.g., hypertext transfer markup language (HTML), rich text format (RTF), etc.) and read by an appropriate program (e.g., word processor, text editor, etc.) without the need for decryption. The plaintext data may include pre-encryption data such as, for example, cleartext data which is to be encrypted prior to transmission and/or storage. In addition, the plaintext data may include post-decryption data such as, for example, data which is the result of decryption on received and/or retrieved data.

Additionally, the plaintext data may include data that is encodable in any format, such as audio/video data (e.g., moving picture experts group (MPEG) data, etc.), image data (e.g., joint photographic experts group (JPEG) data, etc.), financial data (e.g., automatic transfer machine (ATM) transaction data, etc.) and so on, or combinations thereof. The plaintext data may include program data such as, for example, at least a part of a program, an operating system (OS), an application, a virtual machine (e.g., Virtual Machine Monitor (VMM) code, etc.), and so on, or combinations thereof. The plaintext data may also include, for example, an instruction including an opcode, an operand, and so on, or combinations thereof. The plaintext data may also be compressible data (e.g., may be compressed). In addition, the plaintext data may be any data that is input to an encryption operation. In this regard, the plaintext data may be ciphertext data that is encrypted (e.g., by a software program) and that passes through the encryptor 114 to be encrypted again (e.g., via a different key and/or a different encryption operation) when evicted out of core caches.

The unencrypted data may include a plurality of bits. The plurality of bits may include one or more bits (e.g., a byte, etc.) in any code representation, such as binary code, octal code, hexadecimal code, symbolic code, decimal code, alphanumeric code, higher-level programming language code, and so on, or combinations thereof. For example, a memory reference instruction may include a byte for an opcode, bits for an address, and so on, wherein the bits of the memory reference instruction may be represented in hexadecimal code (e.g. machine language), in symbolic code (e.g., assembly language), and so on, or combinations thereof. Additionally, the plurality of bits may be translated to and/or from binary code, wherein the binary code may be executed by the cores 106, 108, may be sorted at the memory 102, may be fetched from the memory 102, and so on, or combinations thereof.

The encryptor 114 may include any type of cipher to generate cyphertext such as, for example, a block cipher in any desired mode of operation to generate ciphertext (e.g., unreadable output from an encryption process) from unencrypted data. In this regard, the unencrypted data may be data that is not yet at all encrypted (e.g., cleartext). In addition, the unencrypted data may be data that is not yet encrypted by the encryptor 114 (e.g., as data that is input to an encryption process), even though the data may be encrypted prior to reaching the encryptor 114 via, for example, using a different key than used by the encryptor 114, a different encryptor than the encryptor 114 (e.g., a software program), and so on. In either case, the block cipher may include a fixed block size, wherein the block cipher may be repeatedly implemented to encrypt data larger than the block size. For example, the block cipher may include advanced encryption standard (AES) in a propagating cipher-block chaining (PCBC) mode of operation, in an electronic code book (ECB) mode of operation, and so on, or combinations thereof. In addition, the block cipher may include an expandable block size.

The memory controller 112 may include a cache line monitor to identify a cache line corresponding to a freed address alias from multiple address aliases, and flush the identified cache line. The memory controller 112 may also include an integrity technique selector to select an integrity technique from multiple integrity techniques (e.g., various cryptographic techniques) to apply to unencrypted and/or encrypted data lines (e.g., aliased by at least one of a plurality of address aliases). The memory controller 112 may also include a memory initializer 152 to write to a location in the memory without first reading previously stored data at the location in the memory. The memory controller 112 may include an allocator 136 to assign/bind a flushed cache line to the data line physical address. The memory controller 112 may further include a first write status evaluator to evaluate an integrity line address location first write status for the integrity line address location identified by the data line physical address, and an integrity line initializer to initialize the integrity line address locations in the memory, responsive to the integrity line address location first write status evaluation.

Figure 8A:
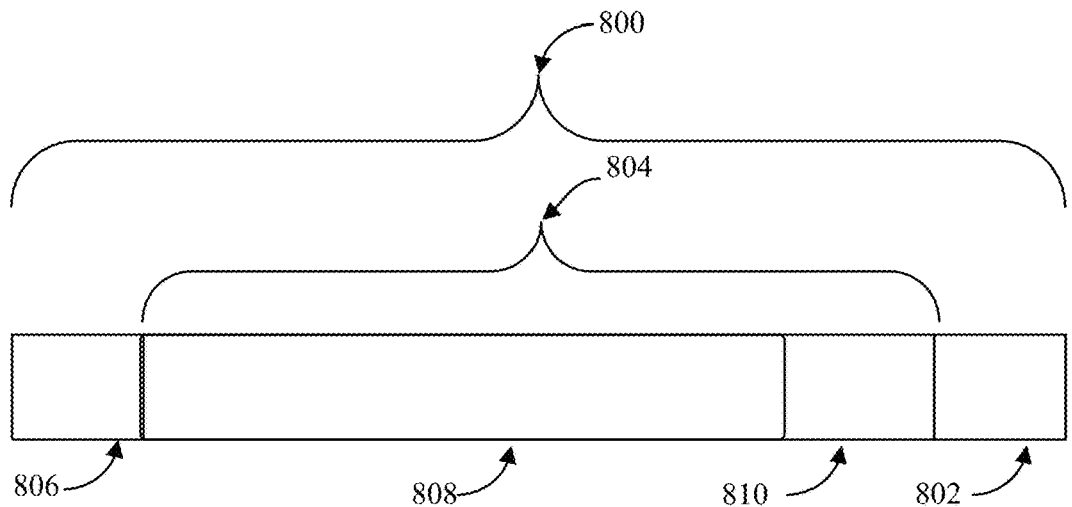
FIGS. 8A-8B are block diagrams of an example of a physical memory address used to determine a key or a tweak, and/or to determine an integrity check line and a slot for an integrity value according to an embodiment.

The memory controller 112 may further include a cache line interpreter to determine, for each cache line, a data physical memory address, as illustrated in FIG. 8A, that includes: data line bytes; a data line physical address comprising an integrity line slot selector and an integrity line index; and a key domain selector formed from unused address bits of the data physical memory address. The integrity line index identifies an integrity line address location in the memory, and the integrity line slot selector identifies an integrity line slot in the integrity line address where an integrity line slot value is stored and used to determine whether an address alias is valid.

The memory controller 112 may further include an alias manager to determine the data line physical address for multiple cache lines that identify alias addresses, wherein the alias addresses alias to a single memory location. The memory controller 112 may include a value selector 132 to set the key domain selector of a cache line with a valid integrity value to designate the cache line as a currently valid address alias. The memory controller 112 may include a data retriever to read the encrypted data line from the data line physical address of the data physical memory address for the cache line, and a decryptor 118 to decrypt the encrypted data line. A decrypted data line may identify the data line physical address, the integrity line index and the integrity line slot selector for the decrypted data line (e.g., as illustrated in FIG. 8A). The memory controller 112 may include a slot value interpreter to read an integrity line slot value stored in the integrity line slot and a comparator (e.g., verifier 156) to confirm a match between the integrity line slot value and the key domain selector of the data physical memory address for the decrypted data (e.g., data line).

The memory controller 112 and/or alias manager may store alias bits (e.g., the integrity line slot selector, the integrity line index, a key domain selector, and/or valid integrity value, or some combination thereof), separate from the data line bytes, in a separate location (e.g., an alias bits cache line and/or alias bits memory location), which the memory controller 112, a data retriever and/or alias manager may retrieve and compare with a request (e.g., request for data identified by a corresponding data line physical address) to ensure that a particular access control policy matches. In the event the alias bits compare with the request fails (e.g., no match results), the memory controller 112 and/or alias manager may report (e.g., raise an alert) the no match condition as one or more of an error or a fault.

The memory controller 112 data retriever (or cores 106, 108) may read the encrypted data line from the data line physical address of the data physical memory address for the at least one cache line of the plurality of cache lines. The decryptor 118 may decrypt the encrypted data line, wherein the decrypted data line identifies the data line physical address, the integrity line index and the integrity line slot selector for the decrypted data line. The comparator (e.g., verifier 156) may identify no match between the integrity line slot value stored and the key domain selector of the data physical memory address for the decrypted data line, and the memory controller 112 and/or comparator, responsive to the no match identification, may cause the memory controller 112 or a component thereof to flush the cache line, and report the no match condition as one or more of an error or a fault.

The memory controller 112 may further include an integrity value embedder to embed, for each cache line, the data line bytes with the valid integrity value for the data physical memory address. The memory controller 112 may also include a compressor to compress the data line bytes embedded with the valid integrity value. The encryptor 114 may encrypt the compressed data line bytes embedded with the valid integrity value, using the selected at least one integrity technique. The memory controller 112 may further include a data line writer to write to the location in the memory identified, by the data line physical address, the valid integrity value to the key domain selector, the data line physical address, and the encrypted and compressed data line bytes embedded with the valid integrity value.

The memory controller 112 and/or the compressor may determine the data line bytes of a particular cache line to be uncompressible, and instead of attempting to embed alias bits (e.g., the integrity line slot selector, the integrity line index, a key domain selector, and/or valid integrity value, or some combination thereof) into the data line with the data line bytes, may store the valid integrity value separately (e.g., in a separate location such as a another cache line and/or memory location).

The illustrated ciphertext discussed herein may be decrypted to generate unencrypted data when the ciphertext is to be fetched from the memory 102 (e.g., read operation). Moreover, encryption and decryption may be implemented over an atomic unit to maximize a random distribution of a plurality of bits, wherein at least a one-bit change may cause a random bit difference at approximately half the total number of bits, and wherein the distribution of the changed bits may be diffused across substantially an entire data line when the cipher block size is as large as the data line. One or more of several techniques may be used to perform the integrity check of data by processing the changed bits, such as searching for randomness, wherein the changed bits may be passed to one or more algorithms/techniques to determine whether the plaintext is modified by performing computations on the values of the changed bits. The distribution may follow, e.g., a binomial IID random distribution bit sequence.

The illustrated memory controller 112 may further include an address scrambler 122 to scramble a physical memory address utilized to access the memory 102, and an inverse address scrambler 124 to reverse the scramble of the physical memory address. The scrambler 122 may map sequential input logical addresses into non-sequential physical addresses, wherein memory access that may logically correspond to a row or column of the memory 102 may be scattered among multiple rows and columns of the memory 102. The scrambler 122 may, for example, generate a random number per power-up of a computing platform, which may be XORed with the physical address. The inverse address scrambler 124 may include the inverse of the address scrambler 122, which may be implemented to descramble in a reverse manner relative to the scramble used. Thus, an adversary may not gain information about the unencrypted data otherwise available by distributing the encrypted data over random locations in the memory 102.

The illustrated memory controller 112 may further include a tweak function 126 to utilize a physical memory address (e.g., scrambled, unscrambled, etc.) as a tweak to a block cipher to bind unencrypted data with the physical memory address. The tweak function 126 may include, for example, XTS (xor-encrypt-xor/XEX-based tweaked-codebook mode with ciphertext stealing) algorithm, Liskov, Rivest, and Wagner (LRW) algorithm, and so on, or combinations thereof. The tweak function 126 may, for example, spread the original physical memory address, XOR the address with the unencrypted data, and run the result through the encryptor 114 with a key to bind the unencrypted data to the address. In one example, when an attack includes swapping ciphertext data to a different memory location, the decryptor 118 may decrypt the ciphertext data with a memory address corresponding to a different memory location, causing corresponding unencrypted data (e.g., plaintext data) to include a random distribution of the plurality of bits.

The illustrated memory controller 112 may further include a decoder 128 to decode the unencrypted data and recognize one or more instructions. For example, uncorrupted unencrypted data (e.g., valid plaintext) may contain opcodes when substantially an entire data line (e.g., a 64-byte cache line) is fetched from the memory 102 and is decrypted. Thus, the decoder 128 may recognize an opcode of an instruction set such as, for example, an x86 instruction set, etc., when the decoder 128 decodes the plaintext data.

The illustrated memory controller 112 may further include a pattern adder 130 to add a recognizable non-random pattern to unencrypted data before the unencrypted data is encrypted. The pattern may be added, for example, to minimize a random distribution of a plurality of bits. For example, the pattern adder 130 may generate and/or add a non-random pattern to the unencrypted data, which may be used as plaintext data input to the encryptor 114. The pattern adder 130 may add n-bits of integrity (e.g., greater than or equal to 32 bits, etc.) to an end of the unencrypted data, an intermediate portion of the unencrypted data, and so on, or combinations thereof. The added pattern may include, for example, an all zero pattern, an all ones pattern, an alternating bit pattern of zeros and ones, and so on, or combinations thereof. In a majority of real data situations, patterns may naturally occur in a data line and, therefore, the recognizable non-random pattern may not be readily utilized. As discussed below, the pattern adder 130 may be used more readily to add a pattern to an integrity check line to be used during error correction.

The illustrated memory controller 112 may further include a value selector 132 to select a key from a plurality of keys (e.g., a key domain) and/or a tweak from a plurality of tweaks (e.g., a tweak domain) for a physical location in the memory 102. For example, the illustrated memory controller 112 may include a function detector 134 to determine that a function (e.g., a program, middleware, an operating system, firmware, virtual machine, VMM, Operating System (OS) kernel, etc.) or a part of the function (e.g., part of a program, etc.) is being launched for the first time, or is being given access to a physical location in the memory 102 for the first time. The value selector 132 may, in response, select a key and/or a tweak (e.g., a key from a key domain, a different key from a same key domain, a different key from a different key domain, a tweak from a tweak domain, a different tweak from a same tweak domain, a different tweak from a different tweak domain, etc.) for the physical location in the memory when the function (and/or part thereof) is given access.

The value selector 132 may select a key based on a value determined from a bit of a physical memory address for a data line, such as an unused address bit. A key domain for a specific physical memory location may be defined by a number of unused address bits to be selected to determine the value. For example, a particular physical memory location may belong to a particular key domain at one time, wherein the unused address bits may be used to define the key domain (e.g., a key domain including 16 keys for a single physical memory location where four unused address bits are utilized). Thus, the physical memory location may use different keys at different points in time based on a domain that the location maps to. The value selector 132 may derive the key by, for example, encrypting the value (e.g., 0001, 0010, etc.) using a secret master key that may be protected (e.g., in a trusted execution environment) by the apparatus 100. In addition, the value selector 132 may derive the key by, for example, retrieving the key from an array of protected keys using the value as a pointer to the array.

Moreover, the value selector 132 may select a tweak by setting a bit of the physical memory address that is to be used as a tweak by the tweak function 126. In this regard, a tweak for XTS mode will include the unused address bits and the used address bits of a physical memory address. Thus, different ciphertext will result from different addresses used for the tweak (even if actually referring to the same location) when the unused address bits are selected/changed by the value selector 132.

The allocator 136 may allocate a physical location in the memory 102 to a function (and/or part thereof) that frees the physical location after use and reallocates the physical location to another function (and/or part thereof). The allocator 136 may include a program executing on the cores 106, 108. In one example, the allocator 136 may be a library to implement functions such as alloc, malloc, new, free, delete, and so on. In another example, the allocator 136 may be heap manager, a stack allocator, and so on. In either case, the functionality of the allocator 136 and the value selector 132 (e.g., a software key/tweak selector) may be combined. For example, the allocator 136 may select which address (including unused address bits) is used to reference a memory location and, therefore, naturally select a key or a tweak that corresponds to the unused address bits which is chosen. Thus, a key (e.g., a different key from a key domain, etc.) and/or a tweak (e.g., a different address for a same physical memory location) may be selected for the physical location when the physical location is free.

The illustrated memory controller 112 may further include a refresher 138 to refresh a part or all of the memory 102 to minimize errors that naturally occur during the passage of time. The refresh may occur periodically, at any predetermined time interval, and the value selector 132 may, in response, select a key (e.g., a different key from a key domain, etc.) or a tweak for the physical location when the physical location is refreshed.

The illustrated memory controller 112 may further include a function classifier 140 to classify a function being assigned a physical location in the memory 102. For example, the function classifier 140 may identify a function type (e.g., a paging kernel within an OS kernel, a VMM, etc.), a function privilege (e.g., a privilege level, etc.), a function section (e.g., a critical code section, etc.), and so on. The value selector 132 may, in response, select a key (e.g., a key corresponding to critical code, a key domain corresponding to critical code, etc.) and/or a tweak (e.g., a tweak corresponding to critical code, etc.) for the physical location to be used by the function section when the function (and/or part thereof) is assigned. Thus, in one example, software domains may be separated using separate key domains.

Notably, using different keys and/or tweaks (e.g., derived by encrypting changing values of unused address bits, by using different physical addresses in XTS mode from changing values of unused address bits, etc.) results in different ciphertext for the same physical memory location at different points in time and provides a time dimension to the memory 102 that allows for memory corruption previously undetectable or uncorrectable to be detected or corrected. For example, replay protection may be provided to prevent a replay of previously stored data encrypted with an obsolete key and/or tweak that occupied a physical memory address. The previously stored data encrypted with the obsolete key and/or tweak will not be replayed since the previously stored data will not decrypt properly with a present key and/or tweak for the same physical memory address, and/or since a mismatch may occur involving an integrity value (e.g., a mismatch between decrypted data and a copy of valid plaintext).

In addition, use-after-free protection may be provided to prevent an obsolete/freed memory address/pointer to be used to access or corrupt newly allocated/reallocated memory. For example, an obsolete pointer (dangling pointer) that is freed by a previous function (e.g., a previous program that accesses memory with the obsolete pointer) and remains discoverable or known to the previous function cannot later be used by the previous function to access or corrupt newly allocated/assigned physical location in the memory 102 that is associated with a present key (e.g., a different key than that of the dangling pointer) and/or tweak being used by a present function to access the memory 102. Similar to replay protection, an integrity check will fail either by improper decryption or mismatch involving an integrity value.

For example, when a software memory allocator (e.g. malloc) re-allocates a physical memory location that was previously freed, the software memory allocator may select an address that maps to a different value of the unused bits of the physical address bits. That is, the software memory allocator may use a different address that still aliases to the same physical memory location as the previous address. The fact that the physical memory address is different (even though the physical memory address is in reference to the unused address bits) signifies that, for example, a tweak value is different and, thus, the ciphertext is different.

Additionally, using different keys and/or tweaks for different locations in the memory 102 provides a spatial dimension to the memory 102, which may allow for memory corruption previously inefficiently detectable or correctable to be efficiently detected or corrected. For example, allocating adjacent data blocks in the memory 102 with different keys and/or tweaks may provide buffer overflow/underflow protection (e.g., protection against a stack overflow, a heap overflow, an exploit that violates intended bounds of a data structure, etc.). In one example, a function (e.g., a program, etc.) that increments past an intended memory address space (e.g., a data line) into adjacent memory space will trigger an integrity failure when the adjacent memory space is associated with a different key and/or tweak that is unknown to the function. Similar to replay protection and use-after-free protection, an integrity check will fail either by improper decryption or mismatch involving an integrity value that may be dependent on the correct address used to access the memory address.

For example, unused address bits may be used to distinguish between adjacent memory allocations. When a buffer (e.g., A) is allocated at a physical address (e.g., 0x00000000001) and a buffer (e.g., B) is allocated at a different physical address (e.g., 0x00000000002), the upper unused address bit for buffer B may be changed (e.g., 0x10000000002). Since the upper address bits may be unused (e.g., unpopulated address bits, so they are free to be reused as aliases for tweaks for the cryptographic algorithm and/or as key selectors for different key domains), the two memory locations are still adjacent but, for example, a tweak for XTS derived from the full address value will be different for the two buffers A, B. Thus, incrementing the memory location 0x00000000001 will result in the wrong tweak when accessing the adjacent memory location 0x00000000002, which may be accessed by using the address 0x10000000002 as the last address value used to write data to that memory location, and therefore, the data's integrity is bound to the address.

Accordingly, implicit bounds for the memory 102 may be created using different keys and/or tweaks. Moreover, the memory 102 may be changed in time and in space using different keys and/or tweaks. In addition, allowing the value selector 132 (e.g., a software value selector) to choose when to encrypt specific memory with a particular key and/or tweak may provide a deterministic approach to memory integrity (e.g., relative to conventional tweak approaches).

The illustrated memory controller 112 further includes logic 142, which may utilize components of the processor 104 such as, e.g., the encryptor 114, the decryptor 118, etc., to maintain (e.g., ensure, verify, test, protect, correct, etc.) the integrity of the memory 102. The logic 142 may identify unencrypted data (e.g., pre-encryption data, post-decryption data, etc.) including a plurality of bits, which may be involved in a memory transaction such as, for example, unencrypted data involved in a read operation from the memory 102 (e.g., post-decryption data), unencrypted data involved in a write operation to the memory 102 (e.g., pre-encryption data), and so on, or combinations thereof.

The logic 142 may make a determination whether the unencrypted data includes a random distribution of the plurality of bits. For example, the logic 142 may determine whether the plurality of bits includes a pattern, a random distribution, and so on, or combinations thereof. The logic 142 may make the determination using any calculated and/or retrieved information. The information may correspond to, for example, the type of data (e.g., instructions, program data, etc.).

The logic 142 may make a determination whether the unencrypted data includes a random distribution of the plurality of bits at any time. For example, the logic 142 may make the determination before data is encrypted (e.g., pre-encryption data) and/or after a fetch of the data from the memory 102 and after the decryptor 118 decrypts the data to generate the unencrypted data (e.g., post-decryption data). The fetch may be in response to, for example, a cache miss. In one example, pre-encryption determination logic (e.g., algorithm, hardware logic, circuit logic, etc.) may be the same as post-decryption corruption detection logic (algorithm, hardware logic, logic, etc.) to ensure that each memory operation direction such as, for example, memory read, memory write, etc., may produce the same determination (e.g., whether or not patterns are present) for the same plaintext data.

Notably, if plaintext data (e.g., pre-encryption data) is a data block of all zeros that is encrypted to form ciphertext (e.g., post-encryption data), a change to the ciphertext may cause approximately fifty percent of the bits to change to ones (e.g., upon decryption), on average, wherein the bits of the corresponding plaintext data may appear in a random distribution (e.g., random bit flips across substantially the entire data block). The ciphertext may be changed, for example, by flipping one or more bits, inserting a bit, deleting a bit, exchanging a bit, modifying the post-encryption data, and so on, or combinations thereof, and the logic 142 may determine that the corresponding plaintext data (e.g., post-decryption data) includes a bit difference at approximately half the total number of bits of the data block. Thus, the encryptor 114 may encrypt a 64-byte data line of program data into a single data block of ciphertext, wherein a change to one or more of the resulting 512 bits of the ciphertext may cause a bit difference at approximately 256 positions out of the 512 bits in the corresponding plaintext, which may be diffused over the substantially the entire decrypted plaintext data block.

The logic 142 may, therefore, examine program data over an amount of memory (e.g., gigabytes of memory) to determine typical patterns appearing at a particular frequency, including relatively common patterns, relatively obscure patterns, and so on, or combinations thereof. In addition, the logic 142 may retrieve information regarding typical patterns from storage such as, for example, memory, a server, etc., from a data structure such as, for example, a table, etc., and so on, or combinations thereof. In one example, program data which is typically stored in the memory 102, fetched, and then decrypted may include more zero (0) bits than one (1) bits. Thus, the logic 142 may identify that more zero (0) bits than one (1) bits are typically encountered in a cache line for program data, and use the pattern to determine whether the unencrypted data includes a random distribution of the plurality of bits.

Repeating bytes or other repeating words is a good determination of non-random data. A threshold can be set for the number of repeating bytes or words, or sets of repeating bytes or words that are sufficient to distinguish data with patterns from pseudorandom sequences of bytes or words. A Boolean true-false test (e.g., 32 bits) may be encountered for authentication operations such as, for example, using a password to log into a computing platform. The logic 142 may determine that the plurality of bits includes a pattern by identifying that a sequence of bits includes a first bit set to one (1), a second bit set to zero (0), and the remaining thirty bits set to zero (0) for a typical thirty-two bit true-false test. Additionally, the logic 142 may determine that the plurality of bits includes a pattern by identifying related patterns that may have a tendency to share the same cache line (e.g., based on the type of data). For example, the logic 142 may identify that instruction data such as, for example, x86 instructions may tend to share a cache line with other instruction data (e.g., x86 instructions, etc.), that program data may tend to share a cache line with other program data, that instruction data may tend to be located at a separate cache line relative to program data, and so on, or combinations thereof. The logic 142 may also identify that a sequence of bits for a type of data may tend to appear together. For example, HTML bit sequences (e.g., HTML patterns) may tend to appear together, ASCII (American Standard Code for Information Interchange) bit sequences (e.g., ASCII patterns) may tend to appear together, MPEG bit sequences (e.g., MPEG patterns) and tend to appear together, and so on. The logic 142 may also use an algorithm from a family that manipulates the input bits using adds, subtracts, and/or XORs etc. The logic 142 may then check whether the values produced satisfy an equation or inequality. The logic 142 may identify whether the sequence of bits for a type of data satisfies a pre-determined mathematical condition, by processing the sequence of bits using a sequence of arithmetic operations that include at least one operation from a plurality of additions, subtractions, multiplications, divisions and/or exponentiations, defined over at least one set from the set of integers, or the set of real numbers, or the set of complex numbers, or the set of prime number-based finite fields or the set of or binary finite fields.

In addition, the logic 142 may retrieve an instruction set such as, for example, an x86 instruction set (e.g., ARM, Sparc, MIPS, etc., likewise, instruction sequences may be byte-code, such as consumed by the Java runtime monitor JVM) from the memory 102 and use corresponding values (e.g., byte values) to determine whether the unencrypted data includes a random distribution of the plurality of bits. Thus, the memory controller 112 may verify whether an unencrypted data line includes a valid stream of instructions such as, for example, a valid stream of x86 instructions, opcodes, etc., to make the determination. For example, the logic 142 may determine whether the plurality of bits includes a pattern by identifying instructions in the unencrypted data for basic operations, such as move, add, and so on.

While the logic 142 may match patterns for an entire instruction set, the logic 142 may seek at least a part of the instruction set such as, for example, byte values "00", "FF", and/or "8B" for an x86 instruction set, which may appear frequently and/or repeatedly within a cache line of a corresponding structure (e.g., x86 structure). Moreover, the decoder 128 may be disposed between the decryptor 118 and the logic 142 to indicate a presence of instructions in the unencrypted data, wherein the logic 142 may utilize the input from the decoder 128 to determine whether the unencrypted data is uncorrupted, does not include a random distribution of the plurality of bits, and so on, or combinations thereof.

The logic 142 may determine that the unencrypted data does not include a random distribution of the plurality of bits when the number of instances satisfies the threshold value. The logic 142 may determine whether the plurality of bits includes a pattern by identifying typical values of an instruction set (e.g., repeated/multiple byte values "00", "FF", and/or "8B" in x86). In the example, the logic 142 may determine that the unencrypted data includes an uncorrupted (e.g., proper, valid, etc.) non-random instruction when the count is greater than or equal to a threshold value of 9. Thus, the memory controller 112 may verify whether an unencrypted cache line includes a valid stream of instructions such as, for example, a valid stream of x86 instructions, operation codes, etc., to make the determination.

The logic 142 may, therefore, determine that unencrypted data does not include a random distribution of the plurality of bits when the unencrypted data includes one or more typical bit sequences (e.g., a pattern) satisfying a threshold value (e.g., threshold of the number of times a pattern appears in a data line, or the number of repeated bytes or words in a data line, etc.). Conversely, the logic 142 may determine that unencrypted data includes a random distribution of a plurality of bits when the unencrypted data does not include one or more typical bit sequences satisfying the threshold value. Thus, the logic 142 may determine that the unencrypted data is corrupt when the threshold value is not satisfied (e.g., improper, invalid, and/or "potentially" corrupt where a secondary ICV check may determine whether the data is actually corrupt, or whether the original data simply appears random or lacks sufficient patterns based on the threshold). The threshold value may be, for example, predetermined and/or set to any value. In addition, the threshold value may be set for a particular type of pattern, may be set for a combination of patterns, and so on, or combinations therefor. Additionally, the patterns may be weighed, for example, to account for relatively common patterns, relatively obscure patterns, and so on, or combinations thereof.

The logic 142 may also detect one or more typical patterns of the program data, instructions, etc., in a decrypted data block and compare the instances of the typical patterns to a probability the sequences would appear in a random distribution of bits. Of note, an opportunity to encounter a pattern may be relatively high for valid plaintext, and/or a probability of random noise creating a recognizable pattern may be relatively low. In addition, the logic 142 may implement a probability function to determine whether the unencrypted data includes a random distribution of the plurality of bits. For example, the function may include a probability density function to verify and/or test whether the unencrypted data includes a random distribution of the plurality of bits. Thus, for example, the logic 142 may implement Posterior probability density function to unencrypted data to make the determination.

The logic 142 may also, for example, implement a compression function to determine whether the unencrypted data includes a random distribution of a plurality of bits. For example, a compression function may look for repeating patterns to achieve compressions. In one example, a compression function may look for a string of zero (0) bits, repeated bytes, etc., and the logic 142 may utilize the compression function to determine ordered (and therefore not random) unencrypted data.

The logic 142 may determine that data line data will not pass a heuristic rule (e.g., a pattern test, etc.) pre-encryption, and responsively store separately (e.g., in a separate location such as a another cache line and/or memory location) a fixed pattern such as, for example, the integrity line slot selector, the integrity line index, a key domain selector, and/or valid integrity value, or some combination thereof for an access control policy. The logic 142 may also determine that unencrypted data (e.g., pre-encryption data) includes a random (e.g., apparently random) distribution of a plurality of bits and, in response, cause an integrity value generator 144 to generate and store an integrity value associated with the unencrypted data on a relatively tailored ad hoc basis. The logic 142 may determine whether an integrity value is appropriate based on a pseudorandom data model and/or a real data model.

An integrity value generator 144 may generate any value that may be used to verify and/or test whether a random distribution of a plurality of bits identified in unencrypted data (e.g., apparent randomness) is a result of a modification to encrypted data or is a result of a legitimate decryption by the decryptor 118 (e.g., the data is valid and apparently random). For example, the integrity value may include an integrity check value (ICV) (e.g., a hash), a message authentication code (MAC) (e.g., the same MAC produced when the same message, secret key, and initialization vector used), a message integrity code (MIC) (e.g., the same MIC produced if the same algorithm is used), a signature (e.g., produced using a private key of a key pair), hash message authentication code/HMAC (e.g., SHA3 HMAC), and so on, or combinations thereof.

In one example, the logic 142 may compute a hash value (e.g., digest) using the unencrypted data (e.g., message, plaintext, etc.) and compare the hash value to a fetched integrity value (e.g., 128-bit ICV, MAC, etc.) generated by the integrity value generator 144 to verify whether the unencrypted data is a result of a legitimate decryption of original data. In another example, the integrity value generator 144 may generate a copy of a portion of unencrypted data (e.g., pre-encryption data) that is stored in an integrity check line as an integrity value based on a determination by the logic 142 that the unencrypted data includes a random distribution of a plurality of bits.

The illustrated memory controller 112 may further include an operator 146 to combine the copy with a portion of ciphertext of unencrypted data. The operator 146 may, for example, XOR bits of the copy generated from a portion of unencrypted data (e.g., pre-encryption data) with bits from a location of ciphertext of the unencrypted data to generate an XOR result, which may be stored as the integrity value. The operator 146 may also inverse the operation (e.g., XORing with X may be reversed by XORing again with X) when the integrity value is used to verify the integrity of unencrypted data. For example, unencrypted data (e.g., post-decryption data) may be generated from fetched ciphertext for the unencrypted data, and the logic 142 may determine that the unencrypted data includes a random distribution of a plurality of bits. The operator 146 may, in response, implement an inverse of the XOR to generate the integrity value that is used to verify the unencrypted data.

Notably, the operator 146 may be implemented to avoid a side channel information disclosure attack when an adversary attempts to determine whether a portion of unencrypted data does not change from run to run (e.g., from memory access to memory access). For example, ciphertext of the unencrypted data will change even when the portion of unencrypted data used to generate the copy may not change from run to run (e.g., when another portion of the plaintext changes, bits diffused with encryption, etc.). Thus, an XOR of bits of the copy with bits from a location in ciphertext of the unencrypted data will change the integrity value that is stored from run to run even though the portion of unencrypted data used to generate the integrity value may not change, and an adversary may not be able to determine that the portion of the unencrypted data does not change by checking the integrity value. The entire integrity line may be encrypted (e.g., XTS AES) to hide a copy of the portion of the plaintext XORed with the portion of the cipher text to avoid disclosure to an adversary.

Figure 8B:
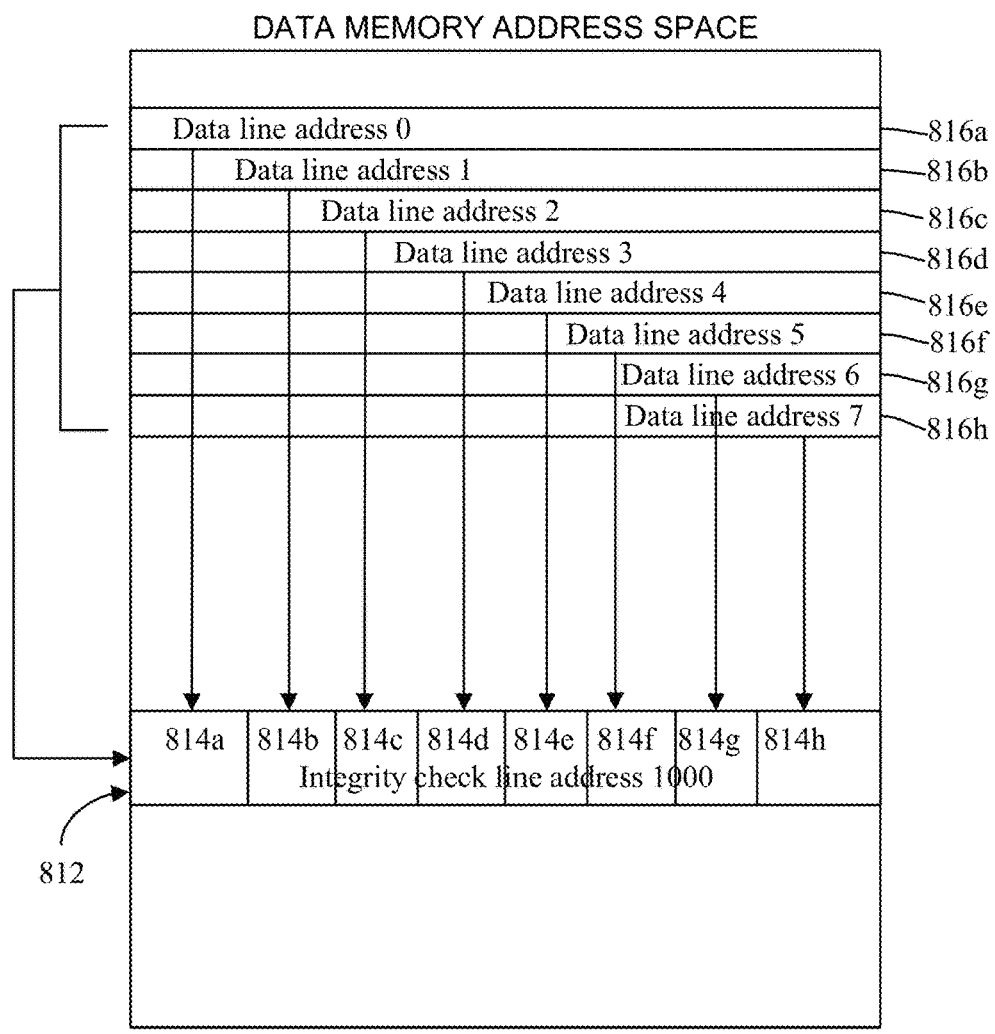

The illustrated memory controller 112 may further include an integrity line selector 148 to select an integrity check line to store an integrity value (e.g., a copy, a MAC, etc.) for the unencrypted data. The integrity line selector 148 may select, for example, an integrity check line for the integrity value that is stored in a region of the memory 102 reserved for integrity data (e.g., a privileged region). In addition, the memory controller 112 may also include a slot selector 150 to select a slot for the integrity value from a plurality of slots in an integrity check line. In one example, each slot of an integrity check line may have a predetermined width (e.g., 16 bits, 32 bits, 64 bits, etc.) to hold an integrity value for unencrypted data. For example, an integrity check line may be 512 bits wide and have eight 64-bit wide slots, sixteen 32-bit side slots, etc. that accommodate eight integrity values associated with eight 512-bit data lines, etc. As shown in FIGS. 8A-8B, discussed below, the location of the integrity check line and the slot may be determined from a physical memory address of a data line.

The integrity check line may be encrypted (e.g., in the same manner as previously discussed for a data line, encrypted with wide diffusion over the whole line, etc.) to detect a malicious n-bit change to any location in ciphertext of the integrity check line (e.g., Threefish, etc.). Alternatively, the integrity check line may be encrypted using normal AES 128/256, ECB or XTS mode, etc. depending on the security objectives. Similarly, the integrity check line may be decrypted such that a malicious n-bit change (e.g., one-bit change, etc.) to ciphertext of the integrity check line may be diffused throughout plaintext generated by decrypting the ciphertext of the integrity check line. The integrity check line may also be encrypted such that a malicious n-bit change to a data block corresponding to a specific integrity value may be diffused throughout only a data block for the integrity value. For example, an integrity value (e.g., a 64-bit value) may be encrypted and decrypted using AES with a fixed block size (e.g., a 128-bit fixed block), wherein a malicious bit change to adjacent data blocks in the integrity check line may not affect the data block for the integrity check value (e.g., two 64-bit integrity values). In this regard, computational efficiency may be achieved during error correction on the integrity check line since only a specific data block may need to be processed to correct an error in the integrity check line. The integrity check line may also be embedded into the plaintext or the ciphertext cache line or data block producing a single value of length equal to the length of the cache line or data block which is protected (e.g., of 512-bits).

Notably, virtual memory mappings may be used to limit access to an integrity check region of the memory 102 by different software entities. A user space application's memory allocator may be given access only to integrity values pertaining exclusively to that same application, as granted by the OS. Thus, one application may be prevented from gaining access to the integrity values in regions pertaining to a different application, minimizing cross-application corruption and/or minimizing an application from corrupting the integrity values of the memory 102 belonging to the privileged OS, VMM, and so on. Processor paging structures may map the virtual memory of an application to a corresponding physical memory location of a relevant integrity check region pertaining to the memory allocated for that application. Further, sub-page policy features may allow more granular access, down to specific integrity check memory lines, to be exclusively granted to an application by the OS, the VMM, and so on.

The illustrated apparatus 100 may further include an initializer 152 to set a value of an integrity check line to an uninitialized value. For example, the function detector 134 may determine that the memory 102 is to be accessed for a first time and/or the value selector 132 may also determine that a function is to be given access to a physical location in the memory 102 via a key and/or a tweak, and the initializer 152 may, in response, set a value of an integrity check line corresponding to the physical location in the memory 102 to an uninitialized value (e.g., all zeros, all ones, etc.), which indicates that no verifiable data has been written to the memory 102 (and/or the specific physical location). The illustrated apparatus 100 may alternatively write for ownership, where a write may change the ICV to a new address value, and may also be used to initialize memory for the first time as there is no preceding read causing an integrity violation.

The memory 102 may, for example, have random data at power up and the initializer 152 may set all integrity values in all integrity check lines to "uninitialized" to minimize faults (e.g., mismatches between power up integrity values and the random data) when the cores 106, 108 read the memory 102 for the first time. As discussed above, privileged software (e.g., OS kernel, VMM, etc.) may access a region of the memory 102 reserved for integrity data when, for example, the OS allocates pages of memory for a first time (before memory is used or written). The OS may, in this case, skip an integrity check involving "uninitialized" integrity values for those physical memory pages until data is first written. In this case, an integrity value in an integrity check line may be set to "uninitialized" when pages of virtual memory are first assigned to physical memory by the OS to avoid latency of initializing all integrity values at once (e.g., by the BIOS on boot). Thus, boot up time of may be improved since integrity values may be set to "uninitialized" page-by-page at the time of first use rather than initially setting all the integrity values to "uninitialized".

Similarly, software may re-assign memory (e.g., free memory) or refresh memory with different keys and/or tweaks, which may cause a fault due to mismatches when the memory is read using an incorrect key (e.g., an obsolete key) and/or an incorrect tweak. In this case, an integrity value may be set to "uninitialized" until a function reads assigned or refreshed memory with a present key and/or tweak (e.g., the function takes ownership with a correct key and may set a present integrity value). Thus, "uninitialized" integrity values may be changed to usable and correct integrity values for data lines presently in the memory 102. Alternatively, a "write for ownership" may be used to associate the integrity of data written to memory without a prior read, with a new key domain or address alias tweak. So that, setting integrity values to "uninitialized" may be unnecessary, because a write for ownership may reset the associated ICV by using processor instructions (e.g., MOVNT) to cause a write combining memory operation.

In one example, the memory controller 112, when intercepting uninitialized settings to the integrity check region, and using unused address bits, a cache or cache coherency entity may snoop the previous address value (differing only in the unused address bits) to force eviction of the old cache lines from the cache 110. In this case, authorized software that sets an integrity value to uninitialized may also specify a corresponding previous domain value (address, or unused address bits) that is to be evicted from the cache 110. In another example, a first cache coherency entity, coupled with a first core (e.g., 106) may determine that a current address value used in a memory access operation issued by second core (e.g., 108) coupled with a second cache coherency entity, differs from a previous address in the unused address bits, and may force eviction of the old cache line from the cache 110.

The integrity check region may be set as a write-through or write combining memory type, where writes by authorized software to the integrity check region are first intercepted by the memory controller 112, causing the appropriate cache evictions of the data lines corresponding to the integrity value slots, before the integrity values are updated in external memory. Alternatively, the cache 110 may treat the unused address bits as aliasing to the same cache locations even though the addresses are different. In addition, the unused address bits may be stored and forwarded by the cache 110 as additional metadata for each cache line indicating the corresponding key and/or tweak.

Additionally, the pattern adder 130, discussed above, may add a recognizable non-random pattern to an integrity check line before encryption and storage. The recognizable non-random pattern (e.g., pad bits) may be evenly interleaved across the integrity check line to simplify integrity check line slot computation (e.g., in hardware). Thus, integrity values in each of the slots may be associated with individual non-random patterns (e.g., pad bits interleaved after each integrity value in each slot). The recognizable non-random pattern may also be distributed at other locations, such as the end of the integrity check line, and so on. Thus, integrity values in each of the slots may be associated with the same non-random pattern in the integrity check line. The recognizable non-random pattern and/or the integrity check value of an integrity check line may be used as error correction in an integrity action.

The integrity action may include preventing access to the unencrypted data when the unencrypted data is corrupt. The logic 142 may also issue a notification to, for example, a predetermined location (e.g., debug environment, log, etc.), to an individual (e.g., administrator, programmer, device owner, etc.), and so on, to implement preventive action. In addition, the logic 142 may issue a notification to a function (e.g., an OS) to notify of, for example, a use-after-free attack (or error), a replay attack (or error), a buffer overflow/underflow attack (or error), and so on, wherein the OS may automatically act to prevent or address the attack. For example, the OS may change the memory 102 back to a prior uncorrupted state, isolate a program attempting to replay data with an obsolete key, erase a dangling pointer, isolate a program incrementing past allocated memory, and so on, or combinations thereof.

The integrity action may also include error correction for unencrypted data such as, for example, plaintext of a data line in the memory 102, plaintext of an integrity check line in the memory 102, and so on, or combinations thereof. In this regard, the illustrated memory controller 112 may include an error corrector 154 to implement error correction for the unencrypted data when the unencrypted data includes a random distribution of the plurality of bits and/or when a recognizable non-random pattern that is expected in the unencrypted data is absent.

The error corrector 154 may, for example, implement a bit flip operation to correct the error in the unencrypted data. The error corrector 154 may implement a one-bit flip operation by flipping a first bit in ciphertext of the unencrypted data while holding the rest of the bits to generate modified ciphertext of the unencrypted data, flipping the first bit back, flipping a second bit in the ciphertext of the unencrypted data while holding the rest of the bits to generate further modified ciphertext of the unencrypted data, and so on, until all bits have been flipped (e.g., bits of ciphertext of an entire data line, bits of ciphertext of an entire integrity check line, bits of ciphertext of an integrity check line only for a fixed block size, etc.). Notably, when a bit is flipped resulting in patterns in the unencrypted data or integrity check line, the apparatus 100 may conclude and/or assume that the bit that was flipped is presently in error, and allows the apparatus 100 to correct the error in the corresponding ciphertext.

Similarly, the error corrector 154 may implement a two-bit flip operation by flipping every two-bit combination in ciphertext to generate modified ciphertext of the unencrypted data. The bit flip operations implemented by the error corrector 154 may be based on, for example, any or all possible bit flip operations, bit error granularity (e.g., a one-bit flip operation for a one-bit error analysis, etc.), and so on. In addition, all modified ciphertext may be decrypted to generate all modified plaintext at the end of all bit flip operations, and/or each modified ciphertext may be decrypted to generate modified plaintext after each bit flip operation. In either case, the modified plaintext may be used to determine whether a specific bit flip operation corrected the error.

The illustrated memory controller 112 further may include a verifier 156 to determine a mismatch/match between plaintext of an integrity value (e.g., a copy stored in an integrity check line) and plaintext of a data line (e.g., a portion copied of the data line), which indicates error corruption or validity of the integrity value and/or of the data line. The verifier 156 may also recognize a non-random pattern (or absence thereof) to indicate the integrity of unencrypted data. In either case, the verifier 156 may recognize that data has been restored by a bit flip operation, and the error corrector 154 may replace ciphertext with modified ciphertext corresponding to the bit operation that restored the non-random pattern, that resulted in plaintext with the largest order (e.g., patterns, etc.), and/or that resulted in a match between the integrity value (if used) and the data line.

The logic 142 may allow access to the unencrypted data when the data does not include a random distribution of a plurality of bits, when the unencrypted data is corrected, when the data line matches an integrity value (that itself is validated), and so on, or combinations thereof. For example, the plaintext of the data line may be placed in the cache 110. The uncorrupted plaintext of the data line may, for example, be passed to a last level cache line. Thus, the plaintext of the data line data may be accessible to the cores 106, 108, and/or may be encrypted and stored for later use in the memory 102.

Memory corruptions caused from components (e.g., internal or external devices, accelerators, etc.) may be detected as these components access memory with addresses that may pertain to a particular key domain or alias and tweak. These devices may use the current and correct address for accessing memory. Similarly, and inversely, software corrupting the memory of such devices may also be detected when an incorrect or non-current address is used.

Although not illustrated in FIG. 1, the apparatus 100 may include other elements on chip with the processor 104. For example, the processor 104 may include input output (10) control logic integrated with the memory controller 112. In addition, the apparatus 100 may include, for example, an IO module, sometimes referred to as a Southbridge of a chipset, that functions as a host device and may communicate with, for example, a front/rear image sensor (e.g., a two-dimensional camera, a three-dimensional camera, etc.), a microphone, a display (e.g., screen), a motion sensor (e.g., an accelerometer, a gyroscope, etc.), mass storage (e.g., hard disk drive/HDD, optical disk, flash memory, etc.), a network interface to provide a wide variety of communication functionality (e.g., cellular telephone, WiFi, WiMax Global Positioning Systems (GPS), spread spectrum (e.g., 900 MHz), other radio frequency (RF), etc.). The processor 104 and the IO module may, for example, be implemented as a system on chip (SoC).

Additionally, while examples have shown separate components for illustration purposes, it is should be understood that one or more of the components of the apparatus 100 may be combined, may reside in the same and/or different physical and/or virtual locations, and so on, or combinations thereof. For example, the logic 142 may include one or more of the components of the memory controller 112 to execute corresponding functionality thereof, which may reside in the same or different location as the cores 106, 108, the memory 102, and so on, or combinations thereof. In addition, one or more components of the memory controller 112 may be implemented in computer program code, such as a software value selector that may interface with one or more components of the memory controller 112 implemented in logic hardware.

The illustrated apparatus 100 therefore delivers an efficient mechanism to protect against physical attacks such as rowhammer attacks, buffer overflows, buffer underflows, data corruption attacks, pointer use-after-free attacks, stack and heap attacks, memory remapping attacks, memory scans, and so on, using address manipulation. The apparatus 100 may provide an efficient alternative to zeroing out memory on reallocation to protect against memory disclosure attacks. The apparatus 100 may add no additional memory overhead beyond memory integrity, and may add no additional software overhead or CPU overhead. Some of the functionality provided by apparatus 100 may be delivered by a System-on-Chip (SoC) IP block on the memory/DRAM (dynamic random access memory) side of the processor cache, enabling the functionality to be used for software running on the host processor (e.g., central processing unit/CPU) cores, as well as on other IP blocks and accelerators such as General Purpose Graphics processing unit (GPGPUs) and integrated graphics (e.g., INTEL GT).

The illustrated apparatus 100 employs unused physical address bits (and/or other metadata passed through the cache) to manipulate cryptographic memory integrity values pointers (e.g., implementing one or more access control policies), enabling software memory allocation routines to control assignment of pointers (e.g., "malloc" and "free"). The apparatus 100 may generally use unused address bits as a key domain. For example, there may be less external physical memory installed in a system than can actually be addressed by a 64 bit physical memory address, so the most significant address bits may be used to select between different "key domains", as the caches may still convey these addresses at the physical memory addresses full resolution to the apparatus 100. The illustrated apparatus 100 may use 5-level paging for virtual memory and 64-bit addressing to allow a software memory allocator/manager (e.g., memory controller) to select between different address values that alias to the same physical memory location. The software memory allocator/manager (e.g., memory controller) may control an integrity value table (or authorized portion thereof) to determine which alias is currently valid, so that use of invalid aliases/addresses by software may then raise a fault in the hardware that may be reported to a software monitor to deal with memory violations.

The illustrated apparatus 100 provides a memory integrity mechanism that may employ error correction code (ECC) memory and/or cryptographic integrity mechanisms that software running on the apparatus 100 may use. Memory integrity hardware optimized to the point of adding no overhead that may be employed by the illustrated apparatus 100, enable software to control current valid integrity values through which a memory alias is currently assigned for a given granular memory location (e.g., cache line). The illustrated apparatus 100, by mixing virtual memory mappings and cache line granularity aliasing, provides that any page in memory may contain a different set of aliases at the cache line level and be non-deterministic to an adversary.

The illustrated apparatus 100 may also use compression to make room for integrity values and the key domain. For example, the illustrated apparatus 100, when employing compression, may forego both encryption and the integrity check and instead only embed the key domain in the cache line. In the extra compressed space made in a data line, the illustrated apparatus 100 may (e.g., in addition to the hash message authentication code/HMAC) embed the unused address bits or "key domain" when writing to memory. When reading memory (e.g. for a compressed data line), the illustrated apparatus 100 may compare the actual unused address bits "key domain" with the key domain value that was embedded/stored in the compressed data line fetched from memory. If the key domain value and the data line fetched from memory match, the illustrated apparatus 100 decompresses and forwards the data to the cache. If the key domain value and the data line fetched from memory do not match, the illustrated apparatus 100 checks with the integrity line to determine which key domain is current (e.g., valid). If the address used to read memory is the current key domain (KD), the illustrated apparatus 100 clears (e.g., zeroes) the data and forces a cache eviction of the old key domain address from the cache (e.g., both of these addresses "alias" to the same external memory location, but the cache holds both alias addresses independently at the full address resolution). The illustrated apparatus 100 may force an eviction by snooping the old key domain address for the same external memory location. If the key domain is not current, the illustrated apparatus 100 reports a fault/error back to software. The illustrated apparatus 100 may expect the software memory manager to access the integrity lines to set the KD value to the correct/current value (e.g., to the key domain that is currently authorized to access the memory location).

Alternatively to compression, the apparatus 100 may use cryptographic techniques to implicitly embed the integrity check based on using the address as a tweak to the block cipher. Because patterns may not be visible on decryption when data is decrypted/un-diffused (due to compressibility of the data), the apparatus 100 may look for patterns via the compressibility of the data (without actually compressing the data) and use diffusion/encryption to ensure detection of an adversarial change in the encrypted data.

The apparatus 100 may enable software to control rollback by having separate "key domains" where the key used to encrypt/decrypt memory is determined by which code, process, core, privilege-level and/or mode software is running on the CPU (e.g., processor) and making a memory request. The apparatus 100 enables software to prevent rollback when creating a new key domain and initially copying code/data. The apparatus 100 may use the key domain identifier to be part of the tweak used in an encryption/decryption tool such as, for example, XTS mode encryption/decryption in addition to the memory address tweak.

Since not all 64 bits (for a 64 bit system) of physical memory are addressable (e.g., occupied with sufficient dual in-line memory modules/DIMMs), the illustrated apparatus 100 may use the most significant address bits as the "Key Domain" selector to determine which key is to be used when encrypting/decrypting the memory for a given data line.

The apparatus 100 may provide protection from memory replay by originating new data in a new key domain, even though the new data may occupy the same physical memory addresses as the old data, the old data encrypted with the old key domain's key cannot be replayed because the old key domain's key will not decrypt properly with the new key domain's key and the integrity check will fail. The apparatus 100 may provide protection from data address use-after-free (e.g., a software memory allocator may use a new key domain when reassigning freed memory to assure that the old/freed memory address/pointer can no longer be used to access the newly allocated/reassigned memory). In the case of use-after-free, the ICV (integrity check value) region may use an ICV region consistent/default key usable to verify ICVs regardless of the key domain selected for encrypting/decrypting the data lines.

Replay Protection may be achieved by software initiating or copying data from an old key domain into a new key domain, wherein a different key domain may also select a different key used to encrypt/decrypt the memory at that location. The apparatus 100 may facilitate separation of software domains (using separate key domains, e.g. to separate processes or privilege levels, or critical code sections such as a paging kernel within the OS/operating system kernel). The apparatus 100 may also provide use-after-free protection (e.g., by a software memory manager re-allocating freed memory using a new key domain to prevent reuse of old pointers/addresses to access new or previously freed data), and bounds/buffer overflow/under flow protection (by software using different key domains when allocating adjacent data buffers). Also, zeroing out the old key domain data on a read from a different key domain address assures data cannot leak from one key domain to another. Because different key domain addresses may map/alias to the same physical memory location, software may use these physical address key domains to protect itself from attacks (i.e. through virtual to physical memory translations). So that, for example, a heap manager software (e.g. malloc or new function) may select different key domain addresses that map to the same physical memory location when reallocating freed memory (e.g., by the free or delete software function), including OS memory allocations, heap manager, stack manager, program loader, just-in-time compiler, etc., effectively, extending the functionality of the apparatus so software may directly control the software's own behavior.

The apparatus 100 may perform initialization of the ICV values, using privileged software (e.g., the Operating System kernel or virtual machine monitor (VMM)) to access the ICV memory (or otherwise interact with the memory integrity IP block). So that when the OS allocates pages of memory for the first time (e.g., before the memory is ever used/written), the ICV values are first set to "uninitialized" by the OS, skipping the ICV check for those physical memory pages until the data is first written. The ICV check should not fail for the first uninitialized (essentially random) memory reads. The OS may set ICVs to "uninitialized" when pages of virtual memory are first assigned to physical memory to avoid the latency of initializing all the ICV values at once (e.g., by the basic input/output system/BIOS on boot), as an optimization to improve the boot time of a system because ICVs can be set to uninitialized page-by-page at the time of first use rather than setting all the ICVs to uninitialized upfront. The apparatus 100 may reset an ICV from "uninitialized" to an expected ICV value on the first read that checks the ICV.

The apparatus 100 may employ other quasi-memory integrity mechanisms. For example, the apparatus 100 may use ECC (Error Correcting Code) memory as a simple integrity mechanism, by including the physical memory address in the ECC calculation, and allow software and/or provide a way for software to communicate with the ECC block which address alias is current, so any content in the cache using an old address may be first evicted, and the ECC code may be set to uninitialized.

The key state change is when the memory manager/software (e.g., memory controller 112) sets ICVs to "uninitialized" indicating that the memory manager/software is about to reassign memory (e.g., the ICV table is a write-through memory type). When observing these state changes the apparatus 100 may simply use the cache coherency protocols to snoop the cache or cause evictions for the corresponding data line addresses for the previous key domain, which may evict any stale dirty data from the caches. The apparatus 100 may buffer the ICV uninitialized writes, as if the writes were a write-combining memory type, until the apparatus 100 completes the stale/dirty data evictions. The buffering allows the write-through ICV updates to complete immediately (e.g., memory manager/software may not have to wait for memory transactions to complete when modifying the ICVs, nor wait for the dirty cache evictions to complete).

The apparatus 100 may pack the Key Domain/alias-ID into the ICV line. When a memory region is reassigned (or assigned for the first time), the software/memory manager may set the new alias ID and ICVs to uninitialized. On memory writes, the apparatus 100 may compare the ID contained in the line address with the alias-ID in the corresponding ICV line. If the comparison results in a match the integrity check is passed. If the comparison results in a mismatch, then either the cache line was stale or the application (e.g., software) is trying to write using a wrong key, and the apparatus 100 (and/or memory controller 112 or the software), may as a result, drop the write request and send a warning to the OS. On reads, the apparatus 100 may perform a regular pattern check first. If fail→check ICV. If ICV mismatch→check the alias-ID. If the alias-IDs mismatch=the application is trying to read data using different key→return 0's and alert the OS/do some other action. If the alias-IDs match=memory content has been modified→try to apply ECC or/and alert OS/reset. The cache architecture may be modified to carry the key-domain as metadata that is stored and compared in cache and communicated to the apparatus 100, but the key-domain may not be part of the address so that multiple copies of the same data in the cache may be avoided.

Figure 2:
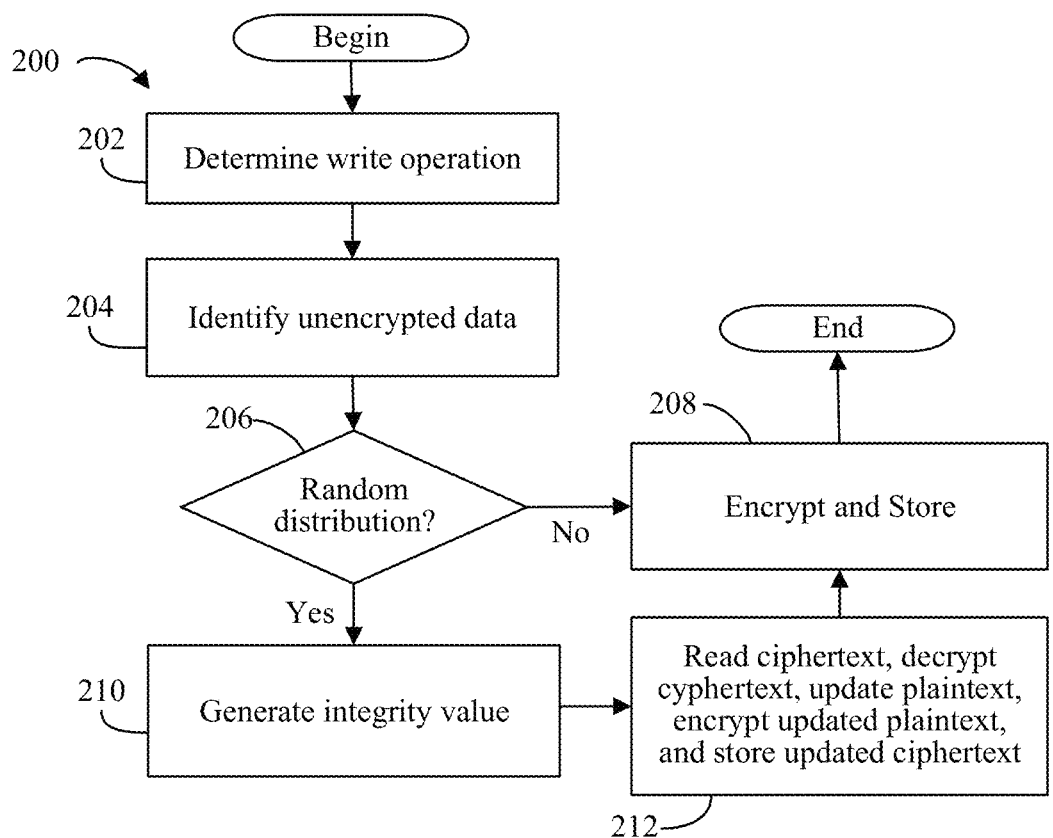
FIG. 2 is a flowchart of an example of a method for a write operation to provide memory integrity according to an embodiment.

Turning now to FIG. 2, an example of a method 200 of conducting a write operation is shown according to an embodiment. The method 200 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 200 may be written in any combination of one or more programming languages, including an object oriented programming language such as Java, Smalltalk, C++ or the like and conventional procedural programming languages, such as the "C" programming language or similar programming languages.

Illustrated processing block 202 determines that a write operation is to be executed, and illustrated processing block 204 identifies unencrypted data including a plurality of bits that is involved in the write operation. The unencrypted data may include, for example, plaintext of a data line. In addition, the write operation may originate from a CPU/Cache that is to write a data line/cache line to external memory (e.g., DRAM). Block 206 determines whether the plurality of bits includes a random distribution. For example, block 206 may utilize a heuristic (e.g., a compression function, repeating bytes beyond a threshold value, etc.) to determine whether the data line to be written to memory approximates random or not.

If block 206 determines that the data line is not random or is ordered (e.g., sufficiently ordered, includes a pattern above a threshold, does not include a random distribution of bits, etc.), illustrated processing block 208 encrypts the data line and sends ciphertext of the data line to the memory. If block 206 determines that the data line is random (e.g., is insufficiently indistinguishable from random), illustrated processing block 210 generates an integrity value for the data line. In this regard, the integrity of the data line (e.g., random data) may be validated using the integrity value for the data line when the data line is read back from memory.

Illustrated processing block 212 reads ciphertext of an integrity check line for the data line (e.g., corresponding to the data line), decrypts the ciphertext to generate plaintext of the integrity check line, updates the plaintext with the integrity value generated by block 210 to generate updated plaintext of the integrity check line (e.g., updates the integrity check line at the corresponding integrity value slot), encrypts the updated plaintext to generate updated ciphertext of the integrity check line, and stores the updated ciphertext. Block 212 may replace an existing integrity value in the plaintext of the integrity check line with the integrity value generated by block 210 to generate the updated plaintext of the integrity check line, which may be encrypted and stored in the memory.

In addition, block 212 may store any or all integrity check lines locally to cache memory to speed up adjacent memory accesses by providing access to recently cached integrity check lines rather than immediately storing integrity check lines to main memory. In this regard, an evicted integrity check line may be written to main memory when the cache memory runs out of space. For example, a least recently used (LRU) cache eviction process may be utilized.

Figure 3:
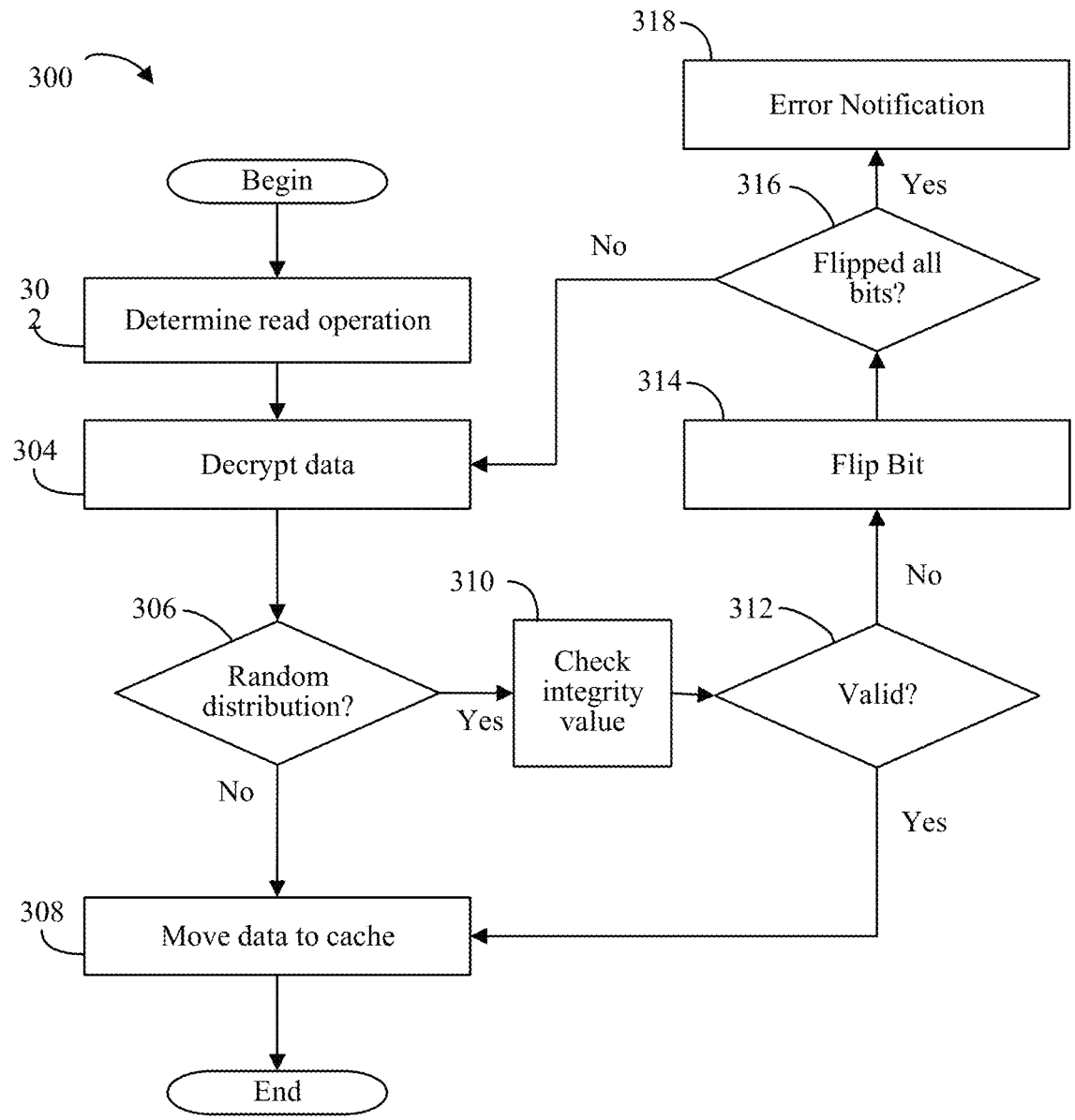
FIG. 3 is a flowchart of an example of a method for a read operation to provide memory integrity according to an embodiment.

Turning now to FIG. 3, an example of a method 300 for a read operation is shown according to an embodiment. The method 300 may be implemented as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated processing block 302 determines that a read operation is to be executed, and illustrated processing block 304 fetches and decrypts encrypted data stored in memory such as, for example, ciphertext of a data line to generate plaintext of the data line. In one example, the read operation may include a cache line that is being read from external memory to a memory controller. Block 306 determines whether a plurality of bits of the plaintext or resulting plaintext includes a random distribution.

For example, block 306 may utilize a heuristic (e.g., a compression function, etc.) to determine whether the data line read from memory approximates random or not. Notable, this may be the same determination function that is run on a memory write operation to determine if plaintext is random (e.g., is insufficiently indistinguishable from random) that the memory write should also calculate and separately store an integrity value. In this case, these determination functions are related. If block 306 determines that the data line is not random or is ordered (e.g., includes a pattern above a threshold, does not include a random distribution of bits, etc.), illustrated processing block 308 moves the data line to cache memory. If block 306 determines that the data line is random, then an integrity value (if any) is checked. If there is no integrity value and/or if the second integrity check involving the integrity value fails (that is, both the implicit pattern/not random check fails and the integrity value fetched from memory also does not match), then error correction may be implemented for the plaintext. In this case, a bit flip operation may be implemented to correct an error.

Illustrated processing block 310 checks an integrity value when block 306 determines that the data line is random. The integrity value may include, for example, a copy of a portion of pre-encryption plaintext data that is stored, whether or not the copy is pre-processed (e.g., XOR result, a Secure Hash Algorithm/SHA HMAC value, etc.). Block 310 may read ciphertext of an integrity check line from memory, decrypt the ciphertext to generate plaintext of the integrity check line, and read the integrity value from the plaintext (which may include an inverse of a Boolean operation used to generate the integrity value used). Block 310 may also read a previously locally cached integrity check line to read a locally cached integrity value.

In either case, block 312 determines whether the plaintext of the data line is valid (even though the plaintext is apparently random). For example, block 312 may determine whether the integrity value matches a portion of the plaintext of the data line read when the integrity value is a copy. If block 312 determines that the plaintext of the data line is valid (e.g., a match), block 308 moves the plaintext of the data line to cache and feeds the plaintext through encryption for storage. If block 312 determines that the plaintext of the data line is not valid, for example by a mismatch from a comparison between the integrity value and the plaintext of the data line, illustrated processing block 314 implements a bit flip operation in an attempt to find and/or correct an error. Block 314 may sequentially flip one bit at a time in ciphertext of the data line to generate modified ciphertext of the data line, and feed the modified ciphertext through decryption to generate modified plaintext of the data line, wherein the modified plaintext may checked for randomness/order and/or a match using the integrity value.

Block 316 determines whether block 314 has finished flipping all bits (e.g., one by one) in the data line. If so, there are no more bits to flip in the data line and illustrated processing block 318 generates an error notification. If not, modified ciphertext of the data line is sent to block 137 to be decrypted to generate modified plaintext of the data line, which is sent to block 306 to determine whether the particular bit flip operation implemented by block 314 corrected an error. In this regard, block 306 may check for a random distribution of the plurality of bits in the modified plaintext of the data line. If block 306 determines that the modified plaintext is ordered, block 308 may move the modified plaintext to cache memory and feed the modified plaintext through encryption for storage.

If block 312 determines that the plaintext is not valid, the process may be iteratively implemented until all bits have been flipped and block 306 determines that the further modified plaintext is ordered and/or block 312 determines that further modified plaintext is valid. Notably, if a plurality of modified plaintext appears valid, block 308 may move the modified plaintext with the largest amount of order (e.g., bit flip position that results in the greatest compressibility, satisfies a compressibility threshold, etc.) to cache memory and feed that modified plaintext through encryption for storage.

Figure 4A:
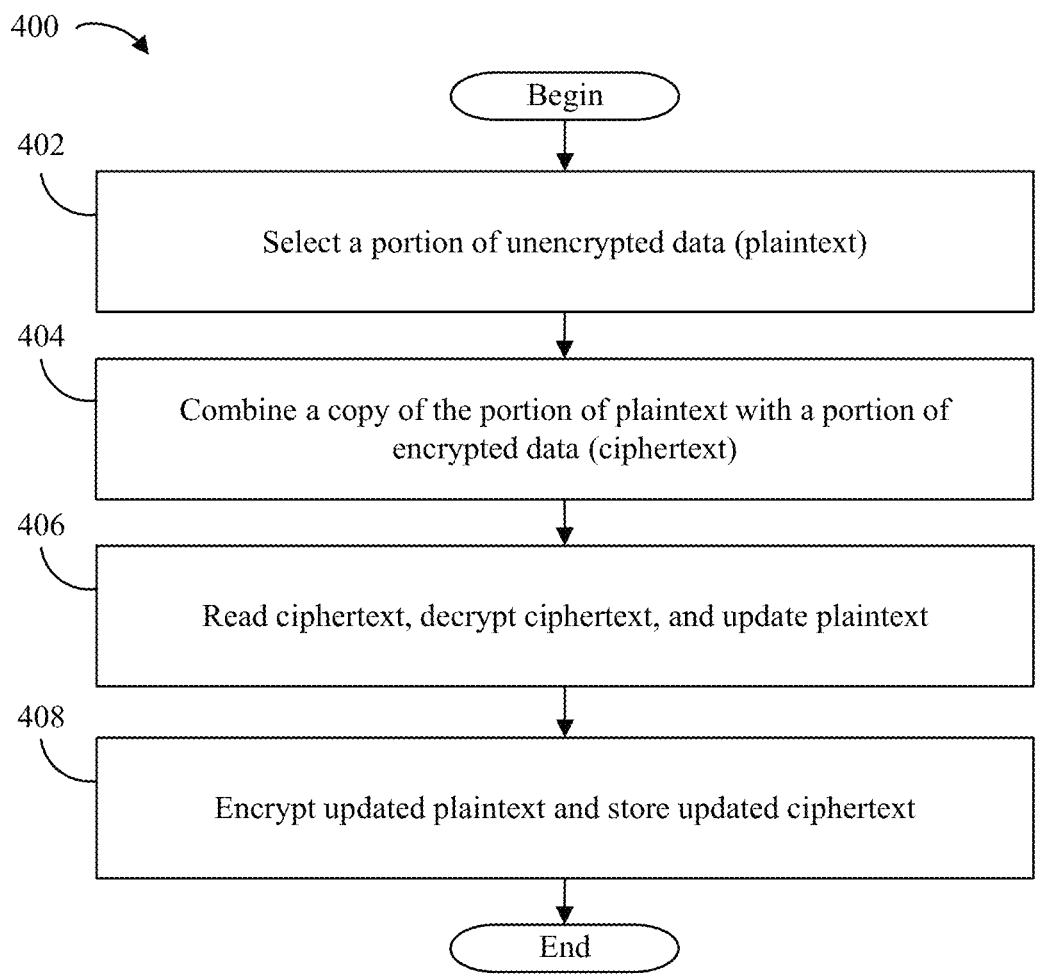
FIG. 4A is a flowchart of an example of a method to generate an integrity value to provide memory integrity according to an embodiment.

FIG. 4A shows an example of a method 400 to generate an integrity value according to an embodiment. The method 400 may be implemented as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated processing block 402 selects a portion of unencrypted data, such as pre-encryption plaintext of a data line, to generate a copy of the portion. In one example, the copy of the portion may be stored as an integrity value in an integrity check line for the data line. Illustrated processing block 404 combines the copy of the portion of the unencrypted data with a portion of encrypted data. For example, block 404 may XOR the copy of the portion of the plaintext of the data line (e.g., 64 bits, sequential or non-sequential) with a portion of ciphertext of the data line (e.g., 64 bits, sequential or non-sequential etc.) to generate the integrity value (e.g., an XOR result).

Accordingly, block 404 may hide whether the portion of the plaintext that is copied is changed or not (with larger portions having a lower probability of collision). For example, the portion of the plaintext used to make the copy that is stored in the integrity check line may not change, and therefore the integrity value may not change. In this case, an adversary may observe the integrity value to gain information about the portion of the plaintext (e.g., that the integrity value does not change) in a side channel attack. Since ciphertext of the plaintext data may always change (e.g., when another portion of the plaintext changes, bits diffused with encryption, etc.), block 404 may provide a different integrity value for the copy of the portion of the plaintext whether or not the portion of the plaintext changes. The illustrated approach may also save die area and/or improve relative performance by not requiring a secondary secure hash such as SHA or MD5. In addition, the integrity value may be a SHA HMAC value calculated over the plaintext (or, alternatively, the ciphertext) of the data line, which may be truncated and stored in a corresponding slot of an integrity check line.

Illustrated processing block 406 reads ciphertext of an integrity check line for the data line, decrypts the ciphertext to generate plaintext of the integrity check line, and updates the plaintext with the integrity value generated by block 404 to generate updated plaintext of the integrity check line. Block 404 may, for example, replace an existing integrity value in the plaintext of the integrity check line with the integrity value generated by block 404 to generate the updated plaintext of the integrity check line.

Illustrated processing block 408 encrypts the updated plaintext to generate updated ciphertext of the integrity check line, and stores the updated ciphertext. Block 408 may, for example, encrypt the updated plaintext using a key known only to an authorized entity, such as privileged software, a trusted execution environment (TEE), a secure processor, a memory controller, a memory controller encryptor/decryptor (which may use a secret key to read and update integrity check lines), and so on. In addition, the encryption (e.g., using a fixed block size, using an expandable block size, using a diffuser 116, etc.) and/or the value (e.g., a key, a tweak, etc.) may be same or different than the encryption and/or the value used to encrypt the data line. Moreover, block 408 may store any or all integrity check lines locally to cache memory to speed up adjacent memory accesses by providing access to recently cached integrity check lines rather than storing integrity check lines to main memory. In this regard, an evicted integrity check line may be written to main memory when the cache memory runs out of space. The illustrated memory controller 22 also may include an inverse diffuser 120 to maximize diffusion. The inverse diffuser 120 may include the inverse of the diffuser 116, which may be implemented to decrypt the ciphertext data in a reverse manner relative to the encryption used.

Figure 4B:
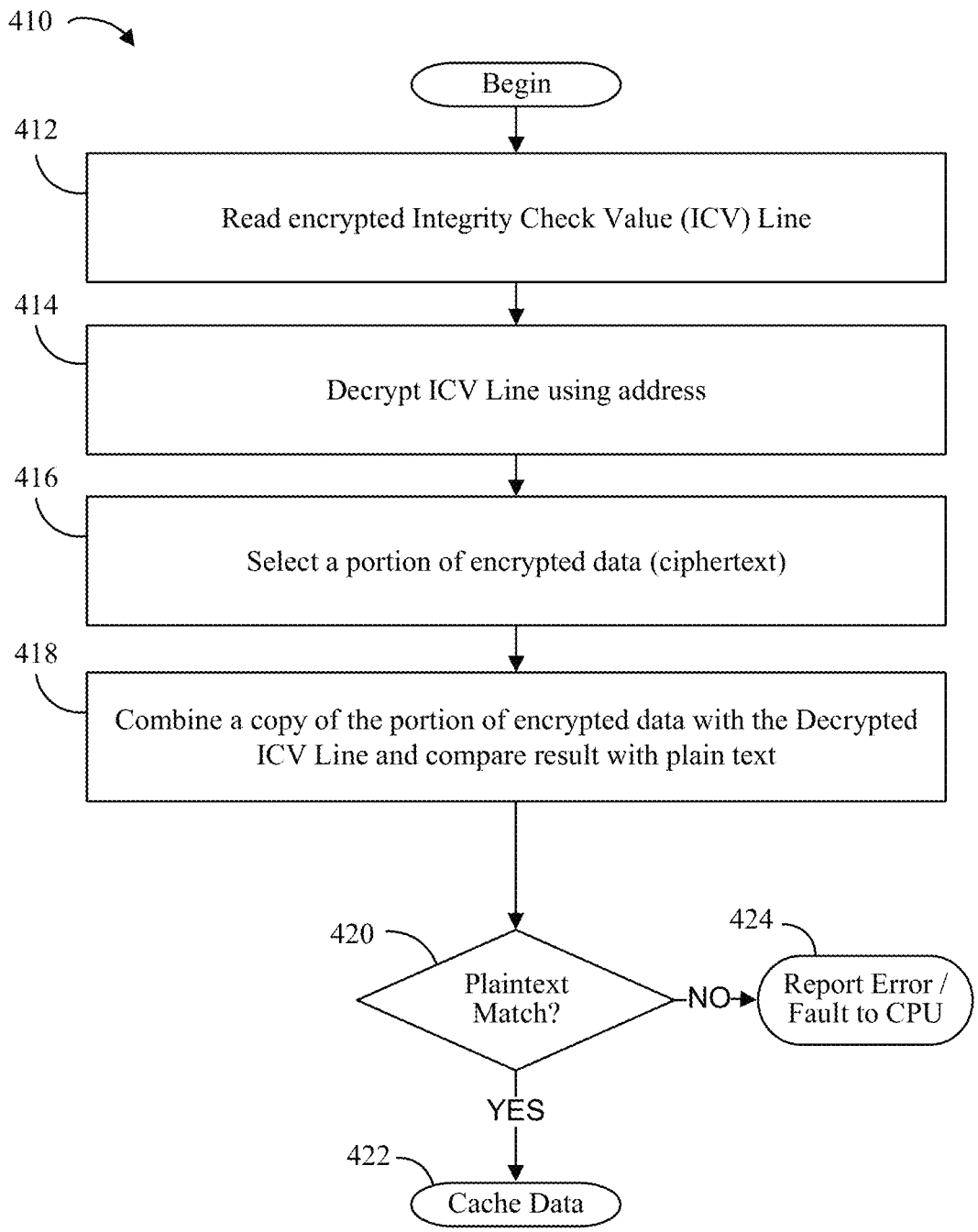
FIG. 4B is a flowchart of an example of a method to check an integrity value to provide memory integrity according to an embodiment.

FIG. 4B is a flowchart of an example of a method 410 to check an integrity value to provide memory integrity according to an embodiment. The method 410 may also be implemented as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. As illustrated above, block 310 (FIG. 3) checks an integrity value. Illustrated processing block 412 may read an encrypted integrity check value (ICV) line, and block 414 decrypts the ICV line using the address (e.g., all or a portion of the data line address and/or the ICV line address). Illustrated processing block 416 may select a portion of encrypted data (e.g., ciphertext) and block 418 may combine a copy of the portion of the encrypted data with the decrypted ICV line and compare the result with plaintext. If the plaintext matches, block 420 forwards the data to cache. If the plaintext does not match, block 420 reports an error and/or fault (e.g., communicating error/fault to the memory controller and/or processor).

Figure 5A:
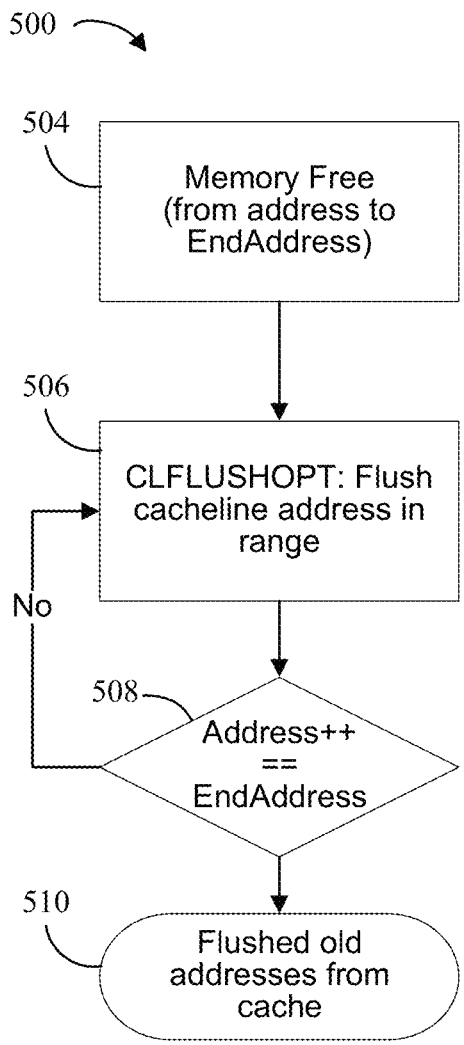
FIGS. 5A and 5B are flowcharts of examples of a method to flush old addresses from cache and bind cache lines to new addresses to provide memory integrity according to an embodiment.
Figure 5B:
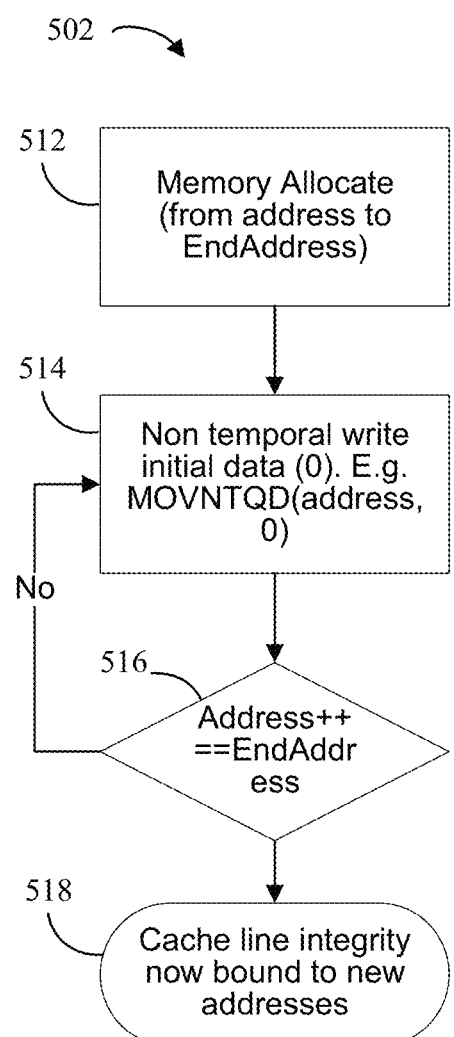

FIGS. 5A and 5B are flowcharts of examples of methods 500 and 502, respectively, of flushing old addresses from cache and binding cache lines to new addresses to provide memory integrity according to an embodiment. Illustrated processing block 504 may free memory (e.g., over a range of memory addresses), and blocks 506 and 508 may perform a cache line flush (e.g., over a range of cache line addresses, for example, corresponding to the range of memory addresses). In this way, freeing memory, block 510, may result in old memory addresses being flushed from cache. Illustrated processing block 512 may allocate memory (e.g., over a range of memory addresses) by performing a non-temporal write of data (e.g., initialization data over a range of memory addresses), at blocks 514 and 516. In this way, block 518 may result in cache line integrity being bound to new addresses. A cache line flush may be performed by a CLFLUSHOPT instruction that flushes a single cache line from cache, and/or the illustrated apparatus 100 and/or the memory controller 112 may define a page flush instruction that flushes cache lines associated with a page of memory from the cache belonging to a selected/identified program (e.g., application), which may save repeatedly calling CLFLUSH/CLFLUSHOPT when freeing large buffers, while retaining page-level permissions and access control policies. In addition to CLFLUSH operations, regarding freeing memory, the illustrated apparatus 100 and/or the memory controller 112 may define an instruction that invalidates cachelines in the cache so that the cachelines (or pages) may not be flushed back to memory (e.g., the cachelines (or pages) may not be expected to be reused by the same address after being freed), thereby saving/avoiding wasted traffic going to memory.

Figure 6:
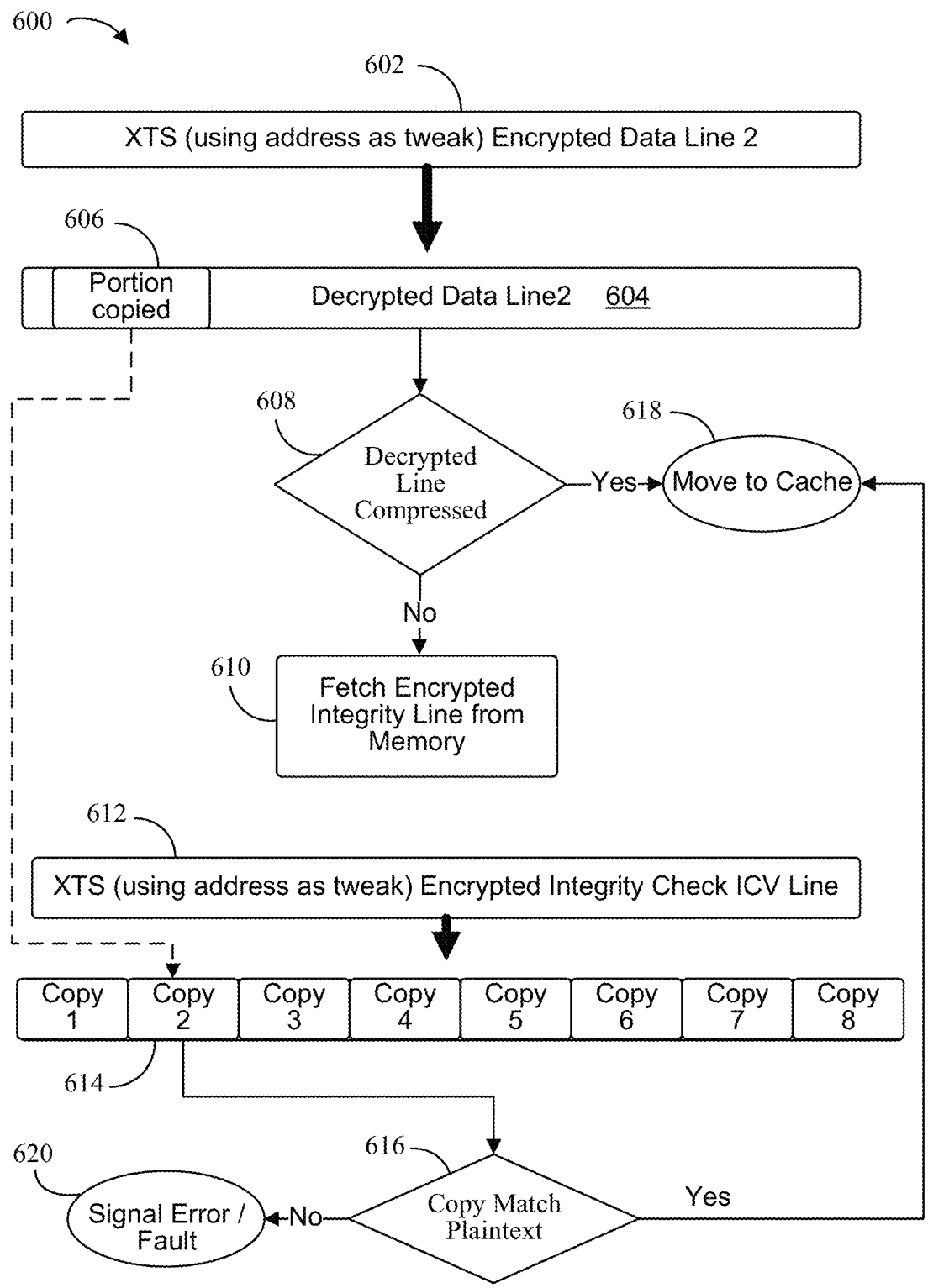
FIG. 6 is a flowchart of an example of a method to read a data line from memory to provide memory integrity according to an embodiment.

FIG. 6 is a flowchart of an example of a method 600 to read a data line from memory to provide memory integrity according to an embodiment. Illustrated block 602 may employ XTS (e.g., or another encryption tool) to use the alias bits 806 (e.g., referring to FIGS. 8A and 8B) as a tweak to identify the data line bytes 802 to decrypt at block 604. Block 608 determines whether the data line is compressible, and if so, block 618 forwards the data line to cache. If Block 608 determines that the data line is not compressible, block 610 fetches the corresponding integrity check line (e.g., 812 determined from the data line address 816a-816h). Block 612 may employ XTS (e.g., or another encryption tool) to decrypt the integrity check value (e.g., located at the corresponding integrity check slot 814a-814h). Block 616 may compare a copy 614 of all or a portion 606 of the decrypted data line bytes with the results (e.g., plaintext) of block 612 to validate the decrypted data line, and block 618 forwards the decrypted data line data to cache when block 616 identifies a match (e.g., the copy 614 matches the plaintext). Otherwise, illustrated block 620 signals (e.g., reports/communicates) an error and/or fault (e.g., communicate integrity check to the memory controller 112 and/or processor 104).

Figure 7:
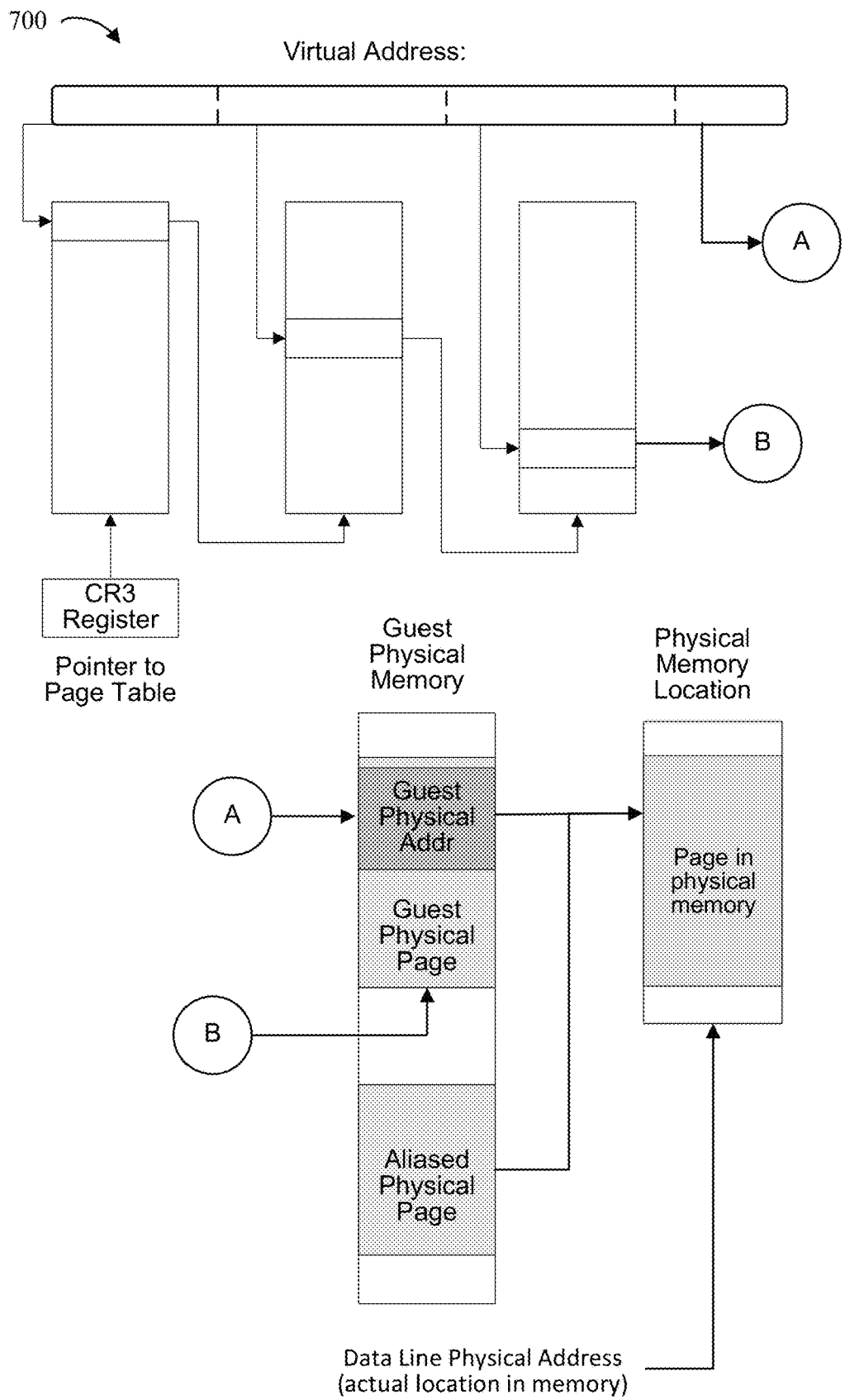
FIG. 7 is a block diagram of an example of a virtual memory to physical memory remapping to provide memory integrity according to an embodiment.

FIG. 7 is a block diagram 700 of an example of a virtual memory to physical memory remapping to provide memory integrity according to an embodiment. A virtual memory address may be mapped to a physical memory address using paging structures (e.g. page tables). Accordingly, software may define a virtual memory address that maps to a physical memory address including unused physical address bits. A different virtual memory address may likewise map to a different physical memory address where the unused address bits are different, but the physical memory location (as determined by the used address bits) is the same. In this regard, the virtual addresses effectively alias to the same physical memory location, but will generate different ciphertext because the address values are different when considering the unused address bits. Thus, the value selector 132 (FIG. 1) may be combined with any other addressing functionality to provide key or tweak capabilities.

The virtual to physical page mappings, as illustrated in FIG. 7, allow ranges of virtual memory addresses to alias to the same physical memory location. For example, for an OS mapping multiple heaps aliasing to the same memory location, the heaps may exist anywhere in the virtual memory space. Similarly, multiple stacks may be aliased to the same memory location, and so on. These ranges may be allocated to a page granularity, allowing select structures (e.g., specific select structures) in the virtual address space to be aliased, providing maximal allocation for the virtual memory space. In addition to the efficient use of the virtual address space, because the virtual address allocations may be non-deterministic as seen by programs, makes guessing the locations of the alternative heaps, stacks, etc. in the whole of the virtual address space difficult for an adversary.

There may be multiple levels of paging, linear/virtual to guest physical addresses (e.g., virtualizing virtual memory) through the OS paging structures (e.g., page tables), and guest physical to host physical through extended page tables (EPTs) that may be additionally managed by a VMM.

The illustrated apparatus 100 and/or the memory controller 112 may use page level aliasing to create different address pools (or ranges) that map to the same memory locations, while having the effect of changing the unused physical address bits (e.g., thereby selecting among different keys or tweaks for cryptography). The illustrated apparatus 100, the memory controller 112, and/or applications employing the apparatus 100 and/or the memory controller 112 may use various memory allocation routines to allocate from among different page-granularity (one or more pages) address ranges while achieving adjacencies at a cacheline granularity by selecting between different aliased page mappings/addresses when allocating different cacheline granularity buffers within a page frame (e.g., the least significant/lower address bits).

While independent methods, blocks, and/or a particular order has been shown for illustration purposes, it should be understood that one or more of the blocks of any of the methods 200, 300, 400, 410, 500, 502 and/or 600, discussed above, may be combined, omitted, bypassed, re-arranged, and/or flow in any order. In one example, the methods 200, 300, 400, 410, 500, 502 and/or 600 may be combined to accomplish one or more functions of the apparatus 100 (FIG. 1), discussed above. In another example, one or more of the blocks of methods 200, 300, 400, 410, 500, 502 and/or 600 may occur in parallel. In addition, it should be understood that any or all of the aspects of examples discussed in FIGS. 1-9 may apply to any or all of the methods 200, 300, 400, 410, 500, 502 and/or 600, and vice versa. For example, encryption, decryption, keys, tweaks, etc., discussed above with regard to FIGS. 1-9 may be included in any or all of the methods 200, 300, 400, 410, 500, 502 and/or 600.

Turning to FIGS. 8A-8B show an example of a physical memory address 800 that may be used to determine a key or a tweak, discussed above, and/or an integrity check line 812 and a slot 814 (814a-814h) for an integrity value associated with a data line 816 (816a-816h) according to an embodiment. The physical memory address 800 may include a plurality of address bits that may be partitioned into a plurality of sections. In the illustrated example, the physical memory address 800 includes an intermediate section 808 that includes a plurality of intermediate address bits, a most significant section 806 that includes a plurality of most significant address bits, and a least significant section 802 that includes a plurality of least significant address bits.

The sections of the data physical memory address 800 may also be identified as data line bytes 802, a data line physical address 804 (actual location in memory of the data) which includes an integrity line slot selector 810 and integrity line index 808 (e.g., an offset to the integrity check line 812), and unused address bits 806 (e.g., alias bits) that alias to the same physical memory. The unused address bits 806 passed through cache, but unused because unpopulated external memory, may be used to encoded alias information in the data physical memory address 800. Accordingly, different keys can be selected based on unused address bits (e.g., XTS may use the alias bits for a tweak for the same physical memory location), where different address aliases may result in different ciphertext even if the data is the same. A memory selector (e.g., memory controller 112) may read the data line physical address 804 and identify the corresponding integrity line address 812 and integrity line slot (e.g., 814a-814h) to use to validate the data line bytes 802 and/or the validity of an integrity check value stored in the integrity line slot (e.g., 814a-814h). The value in the alias bits 806 may be stored in the integrity line slot (e.g., 814a-814h) as ciphertext used to decrypt the data line bytes, and/or compared with a value read from the integrity line slot (e.g., 814a-814h) identified by the alias bits 806 to validate the data line bytes.

Notably, not all bits of memory may be addressable since, for example, the actual memory deployed in a computing platform may be substantially less than a maximum amount of possible memory for which a maximum amount of address space is provisioned. For example, not all 64-bits (of a 64-bit system) of physical memory are addressable (e.g., occupied with sufficient DIMM's). Thus, otherwise unused bits of the physical memory address 800 may be used to determine, for example, which key and/or tweak is to be used when encrypting and/or decrypting memory for a particular data line.

The key domain and/or the tweak domain for the physical memory address 800 may be any size. In the illustrated example, a value selector may use the most significant section 806 to derive a key and/or a tweak for the same physical memory address 800. For example, a software value selector may select from among 16 keys (and/or 16 tweaks) defined by four most significant bits in the most significant section 806. In one example, setting the first bit to zero (0000) or to one (0001) may be used to derive the key tweak (e.g., if set bit to 1, encrypt with 1, if set to 0, encrypt with 0) or the tweak (e.g., if set bit to 1, use 1 in address for tweak, if set to 0, use 0 in address for tweak, etc.). Thus, different keys and/or tweaks may be used. In this case, a first integrity check will fail when data is decrypted with a wrong key and/or a wrong tweak to generate a random distribution of a plurality of bits, and/or a second integrity check will fail when an integrity value is checked against improperly decrypted data.

Additionally, an integrity check line and/or a slot may be determined and selected from the physical memory address 800. For example, an integrity line selector may select the integrity check line from the intermediate bits in the intermediate section 808 of the physical memory address 800, and/or the slot selector may select the slot from the least significant bits of the least significant section 802 of the physical memory address 800. As shown in FIG. 8B, data lines may be stored in data memory address space and integrity values (e.g., an ICV, a copy, etc.) may be stored in integrity data address space. For example, the data lines in the data memory address space begin at address 0, and the integrity check lines in the integrity data memory address space begin 1000 cache lines away at address 1000.

While various strategies may be implemented to map between each of the data lines and each of the integrity check lines (and/or each of the slots thereof) in embodiments, using a data line address may be an efficient approach to determine and select an appropriate integrity check line and an appropriate slot. For example, no lookup table may be needed to determine the appropriate integrity check line and/or the slot for an integrity value. In this regard, a value defined by intermediate bits of each of the data lines 816a-816h may map to the integrity check line 812, indicated by the arrows from the data lines 816a-816h with the addresses 0-7 to the integrity check line 812, and a value defined by least significant bits of each of the data lines 816a-816h may map to the appropriate slot 814a-814h that is to accommodate particular integrity values for each of the data lines 816a-816h, indicated by the location of the arrows.

Generally, selection of an appropriate integrity check line and an appropriate slot may be based on a function, such as (D-Dstart)/8+Istart, wherein the address Dstart of the start of the data memory region is subtracted from the address D of the data line that is to be accessed, wherein Istart is the start of the integrity value memory address space, and wherein the integer division by 8 may be done by shifting the address offset right by 3 (or choosing top bits minus the first 3 bits). Moreover, once the appropriate integrity check line is fetched, the offset for the appropriate slot may be determined by (D-Dstart) % 8, wherein the modulo operation may select the least significant 3 bits of the address. It should be understood that while 3 bits may be used to select from 8 slots on an integrity check line, the integrity check lines may be different in size (e.g., half the size), such that 4 bits may be used to select from 16 slots per integrity check line to save on integrity value overhead, and so on.

The intermediate bits and/or the least significant bits may also be used as an index to an array of assigned locations stored in a privileged/secure memory location to identify the mappings. There may also be an implied mapping, wherein the first slot 814a of the first integrity check line 812 may be automatically selected for the data line 816a having address 0, the second slot 814b of the first integrity check line 812 may be automatically selected for the data line 816b having address 1, and so on. Any functions, mappings, and/or assignments may be used, such that the data lines 816a-816h with the addresses 0-7 may be mapped to anywhere in the integrity data address space, may be mapped to anywhere within the integrity check line 812, and so forth.

Notably, truly random data may typically be accessed adjacently and followed by other random data. For example, a program may decrypt a file or video with sequential block access. Such workloads may overly benefit from the adjacency of integrity values stored together on an integrity check line in memory. In addition, such workloads may complement each other, wherein random access benefits from pattern checking heuristics and contiguous access data benefits from groupings of multiple integrity values in an integrity check line. Moreover, previously read integrity check lines may be cached for further lookups to increase relative efficiency (e.g., particularly in workloads that have relatively high locality).

Figure 9:
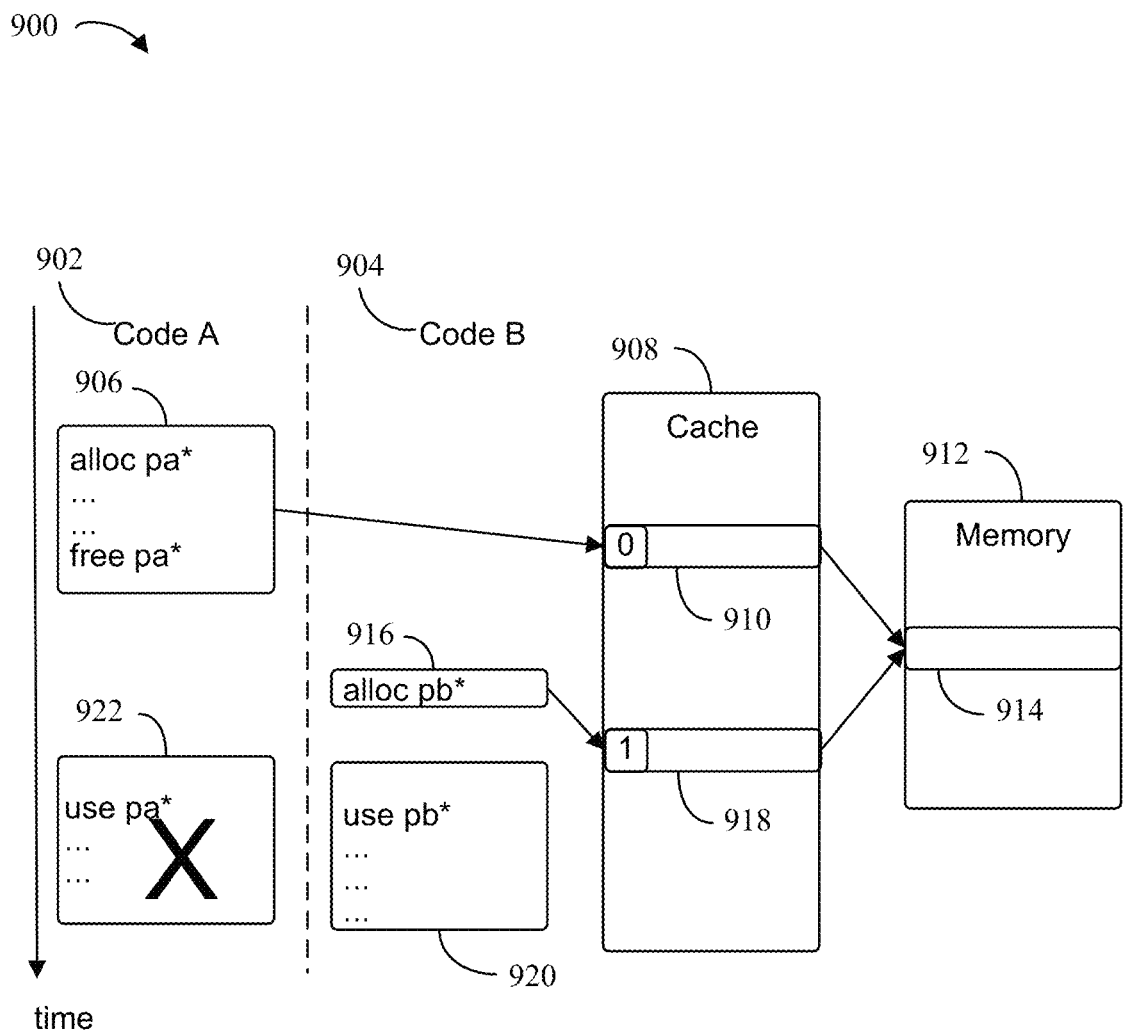
FIG. 9 is a block diagram of an example of Use-After-Free function with Multi-Key Domains to provide memory integrity according to an embodiment.

FIG. 9 is a block diagram 900 of an example of Use-After-Free function with Multi-Key Domains employed to provide memory integrity according to an embodiment. Multiple software applications (e.g., code A 902 and code B 904) may execute code segments (906, 916, 922, 920) over various time periods. For example, code A 902 may execute code segment 906 resulting in allocating memory 912 causing the memory controller 112 to bind a cache line address 910 in cache 908 (e.g., using a key domain value of '0') with a physical memory address 914. Subsequently, the code segment 906 frees the physical memory address 914 upon completion of code segment 906. Later in time code B 904 code segment 916 allocates memory 912 causing the memory controller 112 to bind another cache line address 918 in cache 908 (e.g., using a key domain value of '1') with the same physical memory address 914. And, until code B 904 frees the physical memory address 914, the memory controller using the key domain value of cache line address 918 to integrity check the contents of physical memory address 914 may result in a valid result (e.g., the contents of physical memory address 914 is valid for use by Code B).

However, in the event code segment 922 of Code A 902 attempts to read the contents of physical memory address 914, after code segment 916 binds cache line address 918 with the physical memory address 914, an integrity check using the key domain value (e.g., '0') from cache line 910 will be invalid, and an error and/or fault may be reported (e.g., communicated to code A 902, the memory controller 112 and/or processor 104).

Additional Notes and Examples

Example 1 may include a security-enhanced computing system comprising a processor, a communications interface, cache comprising a plurality of cache lines, memory coupled to the processor, and a memory controller in communications with the processor, cache and memory. The memory controller includes a cache line monitor to identify at least one cache line of the plurality of cache lines corresponding to a freed address alias from a plurality of address aliases, and flush the at least one cache line, and an integrity technique selector to select at least one integrity technique from a plurality of integrity techniques to apply to at least one of an unencrypted data line and an encrypted data line aliased by at least one of a plurality of address aliases.

Example 2 may include the system of Example 1, wherein the memory controller further includes a cache line interpreter to determine from each of the plurality of cache lines a data physical memory address comprising data line bytes, a data line physical address comprising an integrity line slot selector and an integrity line index, and a key domain selector formed from unused address bits of the data physical memory address, wherein the integrity line index identifies an integrity line address location in the memory, and wherein the integrity line slot selector identifies an integrity line slot in the integrity line address, and a value selector to set the key domain selector of the at least one cache line with a valid integrity value to designate the at least one cache line a currently valid address alias.

Example 3 may include the system of Example 2, wherein the memory controller further includes an alias manager to determine the data line physical address for at least two of the plurality of cache lines identify at least two alias addresses of the plurality of alias addresses, wherein the two alias addresses alias to a single memory location.

Example 4 may include the system of Example 2, wherein the memory controller further includes a data retriever to read the encrypted data line from the data line physical address of the data physical memory address for the at least one cache line of the plurality of cache lines, a decryptor to decrypt the encrypted data line, wherein the decrypted data line identifies the data line physical address, the integrity line index and the integrity line slot selector for the decrypted data line, a slot value interpreter to read an integrity line slot value stored in the integrity line slot, and a comparator to confirm a match between the integrity line slot value and the key domain selector of the data physical memory address for the decrypted data.

Example 5 may include the system of Example 2, wherein the memory controller further includes a data retriever to read the encrypted data line from the data line physical address of the data physical memory address for the at least one cache line of the plurality of cache lines, a decryptor to decrypt the encrypted data line, wherein the decrypted data line identifies the data line physical address, the integrity line index and the integrity line slot selector for the decrypted data line, a slot value interpreter to read an integrity line slot value stored in the integrity line slot, and a comparator to identify no match between the integrity line slot value stored and the key domain selector of the data physical memory address for the decrypted data line, and, responsive to the no match identification, flush the at least one cache line, and report the no match condition as one or more of an error or a fault.

Example 6 may include the system of Example 2, wherein, for the at least one cache line, the memory controller further includes a memory initializer to write to the integrity line address location in the memory without first reading previously stored data at the integrity line address location in the memory; an integrity value embedder to embed the data line bytes with the valid integrity value for the data physical memory address, a compressor to compress the data line bytes embedded with the valid integrity value, an encryptor to encrypt the compressed data line bytes embedded with the valid integrity value, using the selected at least one integrity technique, and a data line writer to write to the location in the memory identified by the data line physical address the valid integrity value to the key domain selector, the data line physical address, and the encrypted and compressed data line bytes embedded with the valid integrity value.

Example 7 may include the system of Example 2, wherein the memory controller further includes an allocator to assign the flushed at least one cache line to the data line physical address, a first write status evaluator to evaluate an integrity line address location first write status for at least the integrity line address location identified by the data line physical address, and an integrity line initializer to initialize the integrity line address location of the plurality of integrity line address locations in the memory, responsive to the integrity line address location first write status evaluation.

Example 8 may include a memory integrity apparatus comprising cache comprising a plurality of cache lines, memory, and a memory controller including, a cache line monitor to identify at least one cache line of the plurality of cache lines corresponding to a freed address alias from a plurality of address aliases, and flush the at least one cache line, and an integrity selector to select at least one integrity technique from a plurality of integrity techniques to apply to at least one of an unencrypted data line and an encrypted data line aliased by at least one of the plurality of address aliases.

Example 9 may include the apparatus of Example 8, wherein the memory controller further includes a cache line interpreter to determine from each of the plurality of cache lines a data physical memory address comprising data line bytes, a data line physical address comprising an integrity line slot selector and an integrity line index, and a key domain selector formed from unused address bits of the data physical memory address, wherein the integrity line index identifies an integrity line address location in the memory, and wherein the integrity line slot selector identifies an integrity line slot in the integrity line address.

Example 10 may include the apparatus of Example 9, wherein the memory controller further includes an alias manager to determine the data line physical address for at least two of the plurality of cache lines and identify at least two alias addresses of the plurality of alias addresses, wherein the two alias addresses alias to a single memory location.

Example 11 may include the apparatus of Example 9, wherein the memory controller further includes a value selector to set the key domain selector of the at least one cache line with a valid integrity value to designate the at least one cache line a currently valid address alias.

Example 12 may include the apparatus of Example 11, wherein the memory controller further includes a data retriever to read the encrypted data line from the data line physical address of the data physical memory address for the at least one cache line of the plurality of cache lines, a decryptor to decrypt the encrypted data line, wherein the decrypted data line identifies the data line physical address, the integrity line index and the integrity line slot selector for the decrypted data line, a slot value interpreter to read an integrity line slot value stored in the integrity line slot, and a comparator to identify no match between the integrity line slot value stored and the key domain selector of the data physical memory address for the decrypted data line, and, wherein, responsive to the no match identification, the cache line monitor is to flush the at least one cache line, and report the no match condition as one or more of an error or a fault.

Example 13 may include the apparatus of Example 11, wherein, for the at least one cache line, the memory controller further includes a memory initializer to write to the integrity line address location in the memory without first reading previously stored data at the integrity line address location in the memory, an integrity value embedder to embed the data line bytes with the valid integrity value for the data physical memory address, a compressor to compress the data line bytes embedded with the valid integrity value, an encryptor to encrypt the compressed data line bytes embedded with the valid integrity value, using the selected at least one integrity technique, and a data line writer to write to the location in the memory, identified by the data line physical address, the valid integrity value to the key domain selector, the data line physical address, and the encrypted and compressed data line bytes embedded with the valid integrity value.

Example 14 may include the apparatus of Example 9 to Example 11, wherein the memory controller further includes a data retriever to read the encrypted data line from the data line physical address of the data physical memory address for the at least one cache line of the plurality of cache lines, a decryptor to decrypt the encrypted data line, wherein the decrypted data line identifies the data line physical address, the integrity line index and the integrity line slot selector for the decrypted data line, a slot value interpreter to read an integrity line slot value stored in the integrity line slot, and a comparator to confirm a match between the integrity line slot value and the key domain selector of the data physical memory address for the decrypted data.

Example 15 may include the apparatus of Example 9 to Example 11, wherein the memory controller further includes an allocator to assign the flushed at least one cache line to the data line physical address, a first write status evaluator to evaluate an integrity line address location first write status for at least the integrity line address location identified by the data line physical address, and an integrity line initializer to initialize the integrity line address location of the plurality of integrity line address locations in the memory, responsive to the integrity line address location first write status evaluation.

Example 16 may include at least one computer readable storage medium comprising a set of instructions, which when executed by an apparatus, cause the apparatus to identify at least one cache line of the plurality of cache lines corresponding to a freed address alias from a plurality of address aliases, and flush the at least one cache line, and select at least one integrity technique from a plurality of integrity techniques to apply to at least one of an unencrypted data line and an encrypted data line aliased by at least one of the plurality of address aliases.

Example 17 may include the at least one computer readable storage medium of Example 16, wherein the set of instructions, when executed by the apparatus, cause the apparatus to determine from each of the plurality of cache lines a data physical memory address comprising data line bytes, a data line physical address comprising an integrity line slot selector and an integrity line index, and a key domain selector formed from unused address bits of the data physical memory address, wherein the integrity line index identifies an integrity line address location in the memory, and wherein the integrity line slot selector identifies an integrity line slot in the integrity line address, and set the key domain selector of the at least one cache line with a valid integrity value to designate the at least one cache line a currently valid address alias.

Example 18 may include the at least one computer readable storage medium of Example 17, wherein the set of instructions, when executed by the apparatus, cause the apparatus to determine the data line physical address for at least two of the plurality of cache lines identify at least two alias addresses of the plurality of alias addresses, wherein the two alias addresses alias to a single memory location.

Example 19 may include the at least one computer readable storage medium of Example 17, wherein the set of instructions, when executed by the apparatus, cause the apparatus to read the encrypted data line from the data line physical address of the data physical memory address for the at least one cache line of the plurality of cache lines, decrypt the encrypted data line, wherein the decrypted data line identifies the data line physical address, the integrity line index and the integrity line slot selector for the decrypted data line, read an integrity line slot value stored in the integrity line slot, and confirm a match between the integrity line slot value and the key domain selector of the data physical memory address for the decrypted data.

Example 20 may include the at least one computer readable storage medium of Example 17, wherein the set of instructions, when executed by the apparatus, cause the apparatus to assign the flushed at least one cache line to the data line physical address, evaluate an integrity line address location first write status for at least the integrity line address location identified by the data line physical address, and initialize the integrity line address location of the plurality of integrity line address locations in the memory, responsive to the integrity line address location first write status evaluation.

Example 21 may include a method of operating a memory integrity apparatus, comprising identifying at least one cache line of the plurality of cache lines corresponding to a freed address alias from a plurality of address aliases, flushing the at least one cache line, and selecting at least one integrity technique from a plurality of integrity techniques to apply to at least one of an unencrypted data line and an encrypted data line aliased by at least one of the plurality of address aliases.

Example 22 may include the method of Example 21, further comprising determining from each of the plurality of cache lines a data physical memory address comprising data line bytes, a data line physical address comprising an integrity line slot selector and an integrity line index, and a key domain selector formed from unused address bits of the data physical memory address, wherein the integrity line index identifies an integrity line address location in the memory, and wherein the integrity line slot selector identifies an integrity line slot in the integrity line address, and setting the key domain selector of the at least one cache line with a valid integrity value to designate the at least one cache line a currently valid address alias.

Example 23 may include the method of Example 22, further comprising determining the data line physical address for at least two of the plurality of cache lines identify at least two alias addresses of the plurality of alias addresses, wherein the two alias addresses alias to a single memory location, reading the encrypted data line from the data line physical address of the data physical memory address for the at least one cache line of the plurality of cache lines, decrypting the encrypted data line, wherein the decrypted data line identifies the data line physical address, the integrity line index and the integrity line slot selector for the decrypted data line, reading an integrity line slot value stored in the integrity line slot, and confirming a match between the integrity line slot value and the key domain selector of the data physical memory address for the decrypted data.

Example 24 may include the method of Example 22, for the at least one cache line, further comprising writing to the integrity line address location in the memory without first reading previously stored data at the integrity line address location in the memory, embedding the data line bytes with the valid integrity value for the data physical memory address, compressing the data line bytes embedded with the valid integrity value, encrypting the compressed data line bytes embedded with the valid integrity value, using the selected at least one integrity technique, and writing to the location in the memory identified by the data line physical address the valid integrity value to the key domain selector, the data line physical address, and the encrypted and compressed data line bytes embedded with the valid integrity value.

Example 25 may include the method of Example 22, further comprising assigning the flushed at least one cache line to the data line physical address, evaluating an integrity line address location first write status for at least the integrity line address location identified by the data line physical address, and initializing the integrity line address location of the plurality of integrity line address locations in the memory, responsive to the integrity line address location first write status evaluation.

Example 26 may include a memory integrity apparatus comprising means for identifying at least one cache line of the plurality of cache lines corresponding to a freed address alias from a plurality of address aliases, means for flushing the at least one cache line, means for selecting at least one integrity technique from a plurality of integrity techniques to apply to at least one of an unencrypted data line and an encrypted data line, and means for writing to a location in the memory without first reading previously stored data at the location in the memory.

Example 27 may include the apparatus of Example 26, further comprising means for determining from each of the plurality of cache lines a data physical memory address comprising data line bytes; a data line physical address comprising an integrity line slot selector and an integrity line index, and a key domain selector formed from unused address bits of the data physical memory address, wherein the integrity line index is to identify an integrity line address location in the memory, and wherein the integrity line slot selector is to identify an integrity line slot in the integrity line address, and means for setting the key domain selector of the at least one cache line with a valid integrity value to designate the at least one cache line a currently valid address alias.

Example 28 may include the apparatus of Example 27, further comprising means for determining the data line physical address for at least two of the plurality of cache lines identify at least two alias addresses of the plurality of alias addresses, wherein the two alias addresses are to alias to a single memory location, means for reading the encrypted data line from the data line physical address of the data physical memory address for the at least one cache line of the plurality of cache lines, means for decrypting the encrypted data line, wherein the decrypted data line is to identify the data line physical address, the integrity line index and the integrity line slot selector for the decrypted data line, means for reading an integrity line slot value stored in the integrity line slot, and means for confirming a match between the integrity line slot value and the key domain selector of the data physical memory address for the decrypted data.

Example 29 may include the apparatus of Example 27, for the at least one cache line further comprising means for embedding the data line bytes with the valid integrity value for the data physical memory address, means for compressing the data line bytes embedded with the valid integrity value, means for encrypting the compressed data line bytes embedded with the valid integrity value, using the selected at least one integrity technique, and means for writing to the location in the memory identified by the data line physical address the valid integrity value to the key domain selector, the data line physical address, and the encrypted and compressed data line bytes embedded with the valid integrity value.

Example 30 may include the apparatus of Example 27, further comprising means for assigning the flushed at least one cache line to the data line physical address, means for evaluating an integrity line address location first write status for at least the integrity line address location identified by the data line physical address, and means for initializing the integrity line address location of the plurality of integrity line address locations in the memory, responsive to the integrity line address location first write status evaluation.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, the manufactured of devices of smaller size is expected. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" or "at least one of" may mean any combination of the listed terms. For example, the phrases "one or more of A, B or C" may mean A; B; C; A and B; A and C; B and C; or A, B and C. In addition, a list of items joined by the term "and so forth", "and so on", or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
 a processor;
 a communications interface;
 cache comprising a plurality of cache lines;
 memory coupled to the processor; and
 a memory controller in communications with the processor, cache and memory, the memory controller including:
  a cache line monitor to identify at least one cache line of the plurality of cache lines corresponding to a freed address alias from a plurality of address aliases, and flush the at least one cache line;
  an integrity technique selector to select at least one integrity technique from a plurality of integrity techniques to apply to at least one of an unencrypted data line and an encrypted data line;
  a memory initializer to write to a location in the memory without first reading previously stored data at the location in the memory, wherein the location in the memory includes at least one in an array of memory cells arranged in rows and columns, and partitioned into independently addressable storage locations;
  an address scrambler to scramble a physical memory address utilized to access the memory; and
  an inverse address scrambler to reverse the scramble of the physical memory address.

2. The system of claim 1, wherein the memory controller further includes:
 a cache line interpreter to determine from each of the plurality of cache lines a data physical memory address comprising: data line bytes; a data line physical address comprising an integrity line slot selector and an integrity line index; and a key domain selector formed from unused address bits of the data physical memory address, wherein the integrity line index identifies an integrity line address location in the memory, and wherein the integrity line slot selector identifies an integrity line slot in the integrity line address; and
 a value selector to set the key domain selector of the at least one cache line with a valid integrity value to designate the at least one cache line a currently valid address alias.

3. The system of claim 2, wherein the memory controller further includes an alias manager to determine the data line physical address for at least two of the plurality of cache lines that identify at least two alias addresses of the plurality of alias addresses, wherein the two alias addresses alias to a single memory location.

4. The system of claim 2, wherein the memory controller further includes:
 a data retriever to read the encrypted data line from the data line physical address of the data physical memory address for the at least one cache line of the plurality of cache lines;
 a decryptor to decrypt the encrypted data line, wherein the decrypted data line identifies the data line physical address, the integrity line index and the integrity line slot selector for the decrypted data line;
 a slot value interpreter to read an integrity line slot value stored in the integrity line slot; and
 a comparator to confirm a match between the integrity line slot value and the key domain selector of the data physical memory address for the decrypted data.

5. The system of claim 2, wherein the memory controller further includes:
 a data retriever to read the encrypted data line from the data line physical address of the data physical memory address for the at least one cache line of the plurality of cache lines;
 a decryptor to decrypt the encrypted data line, wherein the decrypted data line identifies the data line physical address, the integrity line index and the integrity line slot selector for the decrypted data line;
 a slot value interpreter to read an integrity line slot value stored in the integrity line slot; and
 a comparator to identify no match between the integrity line slot value stored and the key domain selector of the data physical memory address for the decrypted data line; and, responsive to the no match identification, flush the at least one cache line, and report the no match condition as one or more of an error or a fault.

6. The system of claim 2, wherein, for the at least one cache line, the memory controller further includes:
 an integrity value embedder to embed the data line bytes with the valid integrity value for the data physical memory address;
 a compressor to compress the data line bytes embedded with the valid integrity value;
 an encryptor to encrypt the compressed data line bytes embedded with the valid integrity value, using the selected at least one integrity technique; and
 a data line writer to write to the location in the memory identified by the data line physical address: the valid integrity value to the key domain selector; the data line physical address; and the encrypted and compressed data line bytes embedded with the valid integrity value.

7. The system of claim 2, wherein the memory controller further includes:
an allocator to assign the flushed at least one cache line to the data line physical address;
a first write status evaluator to evaluate an integrity line address location first write status for at least the integrity line address location identified by the data line physical address; and
an integrity line initializer to initialize the integrity line address location of the plurality of integrity line address locations in the memory, responsive to the integrity line address location first write status evaluation.

8. An apparatus comprising:
cache comprising a plurality of cache lines;
memory; and
a memory controller including,
a cache line monitor to identify at least one cache line of the plurality of cache lines corresponding to a freed address alias from a plurality of address aliases, and flush the at least one cache line,
an integrity technique selector to select at least one integrity technique from a plurality of integrity techniques to apply to at least one of an unencrypted data line and an encrypted data line,
memory initializer to write to a location in the memory without first reading previously stored data at the location in the memory, wherein the location in the memory includes at least one in an array of memory cells arranged in rows and columns, and partitioned into independently addressable storage locations;
an address scrambler to scramble a physical memory address utilized to access the memory; and
an inverse address scrambler to reverse the scramble of the physical memory address.

9. The apparatus of claim 8, wherein the memory controller further includes:
a cache line interpreter to determine from each of the plurality of cache lines a data physical memory address comprising: data line bytes; a data line physical address comprising an integrity line slot selector and an integrity line index; and a key domain selector formed from unused address bits of the data physical memory address, wherein the integrity line index identifies an integrity line address location in the memory, and wherein the integrity line slot selector identifies an integrity line slot in the integrity line address.

10. The apparatus of claim 9, wherein the memory controller further includes an alias manager to determine the data line physical address for at least two of the plurality of cache lines and identify at least two alias addresses of the plurality of alias addresses, wherein the two alias addresses alias to a single memory location.

11. The apparatus of claim 9, wherein the memory controller further includes a value selector to set the key domain selector of the at least one cache line with a valid integrity value to designate the at least one cache line a currently valid address alias.

12. The apparatus of claim 11, wherein the memory controller further includes:
a data retriever to read the encrypted data line from the data line physical address of the data physical memory address for the at least one cache line of the plurality of cache lines;
a decryptor to decrypt the encrypted data line, wherein the decrypted data line identifies the data line physical address, the integrity line index and the integrity line slot selector for the decrypted data line;
a slot value interpreter to read an integrity line slot value stored in the integrity line slot; and
a comparator to identify no match between the integrity line slot value stored and the key domain selector of the data physical memory address for the decrypted data line; and, wherein, responsive to the no match identification, the cache line monitor is to flush the at least one cache line, and report the no match condition as one or more of an error or a fault.

13. The apparatus of claim 11, wherein, for the at least one cache line, the memory controller further includes:
an integrity value embedder to embed the data line bytes with the valid integrity value for the data physical memory address;
a compressor to compress the data line bytes embedded with the valid integrity value;
an encryptor to encrypt the compressed data line bytes embedded with the valid integrity value, using the selected at least one integrity technique; and
a data line writer to write to the location in the memory identified by the data line physical address: the valid integrity value to the key domain selector; the data line physical address; and the encrypted and compressed data line bytes embedded with the valid integrity value.

14. The apparatus of claim 9, wherein the memory controller further includes:
a data retriever to read the encrypted data line from the data line physical address of the data physical memory address for the at least one cache line of the plurality of cache lines;
a decryptor to decrypt the encrypted data line, wherein the decrypted data line identifies the data line physical address, the integrity line index and the integrity line slot selector for the decrypted data line;
a slot value interpreter to read an integrity line slot value stored in the integrity line slot; and
a comparator to confirm a match between the integrity line slot value and the key domain selector of the data physical memory address for the decrypted data.

15. The apparatus of claim 9, wherein the memory controller further includes:
an allocator to assign the flushed at least one cache line to the data line physical address;
a first write status evaluator to evaluate an integrity line address location first write status for at least the integrity line address location identified by the data line physical address; and
an integrity line initializer to initialize the integrity line address location of the plurality of integrity line address locations in the memory, responsive to the integrity line address location first write status evaluation.

16. At least one computer readable storage medium comprising a set of instructions, which when executed by an apparatus, cause the apparatus to:
identify at least one cache line of the plurality of cache lines corresponding to a freed address alias from a plurality of address aliases, and flush the at least one cache line;
select at least one integrity technique from a plurality of integrity techniques to apply to at least one of an unencrypted data line and an encrypted data line;
write to a location in the memory without first reading previously stored data at the location in the memory, wherein the location in the memory includes at least one in an array of memory cells arranged in rows and columns, and partitioned into independently addressable storage locations, wherein the location in the memory includes at least one in an array of memory cells arranged in rows and columns, and partitioned into independently addressable storage locations;

scramble a physical memory address utilized to access the memory; and reverse the scramble of the physical memory address.

17. The at least one computer readable storage medium of claim 16, wherein the set of instructions, when executed by the apparatus, cause the apparatus to:

determine from each of the plurality of cache lines a data physical memory address comprising: data line bytes; a data line physical address comprising an integrity line slot selector and an integrity line index; and a key domain selector formed from unused address bits of the data physical memory address, wherein the integrity line index identifies an integrity line address location in the memory, and wherein the integrity line slot selector identifies an integrity line slot in the integrity line address; and set the key domain selector of the at least one cache line with a valid integrity value to designate the at least one cache line a currently valid address alias.

18. The at least one computer readable storage medium of claim 17, wherein the set of instructions, when executed by the apparatus, cause the apparatus to: determine the data line physical address for at least two of the plurality of cache lines identify at least two alias addresses of the plurality of alias addresses, wherein the two alias addresses alias to a single memory location.

19. The at least one computer readable storage medium of claim 17, wherein the set of instructions, when executed by the apparatus, cause the apparatus to:

read the encrypted data line from the data line physical address of the data physical memory address for the at least one cache line of the plurality of cache lines;

decrypt the encrypted data line, wherein the decrypted data line identifies the data line physical address, the integrity line index and the integrity line slot selector for the decrypted data line;

read an integrity line slot value stored in the integrity line slot; and confirm a match between the integrity line slot value and the key domain selector of the data physical memory address for the decrypted data.

20. The at least one computer readable storage medium of claim 17, wherein the set of instructions, when executed by the apparatus, cause the apparatus to:

assign the flushed at least one cache line to the data line physical address;

evaluate an integrity line address location first write status for at least the integrity line address location identified by the data line physical address; and initialize the integrity line address location of the plurality of integrity line address locations in the memory, responsive to the integrity line address location first write status evaluation.

21. A method comprising:

identifying at least one cache line of the plurality of cache lines corresponding to a freed address alias from a plurality of address aliases;

flushing the at least one cache line;

selecting at least one integrity technique from a plurality of integrity techniques to apply to at least one of an unencrypted data line and an encrypted data line;

writing to a location in the memory without first reading previously stored data at the location in the memory, wherein the location in the memory includes at least one in an array of memory cells arranged in rows and columns, and partitioned into independently addressable storage locations, wherein the location in the memory includes at least one in an array of memory cells arranged in rows and columns, and partitioned into independently addressable storage locations;

scrambling a physical memory address utilized to access the memory; and reversing the scramble of the physical memory address.

22. The method of claim 21, further comprising:

determining from each of the plurality of cache lines a data physical memory address comprising: data line bytes; a data line physical address comprising an integrity line slot selector and an integrity line index; and a key domain selector formed from unused address bits of the data physical memory address, wherein the integrity line index identifies an integrity line address location in the memory, and wherein the integrity line slot selector identifies an integrity line slot in the integrity line address; and setting the key domain selector of the at least one cache line with a valid integrity value to designate the at least one cache line a currently valid address alias.

23. The method of claim 22, further comprising:

determining the data line physical address for at least two of the plurality of cache lines identify at least two alias addresses of the plurality of alias addresses, wherein the two alias addresses alias to a single memory location;

reading the encrypted data line from the data line physical address of the data physical memory address for the at least one cache line of the plurality of cache lines;

decrypting the encrypted data line, wherein the decrypted data line identifies the data line physical address, the integrity line index and the integrity line slot selector for the decrypted data line;

reading an integrity line slot value stored in the integrity line slot; and confirming a match between the integrity line slot value and the key domain selector of the data physical memory address for the decrypted data.

24. The method of claim 22, for the at least one cache line: further comprising:

embedding the data line bytes with the valid integrity value for the data physical memory address;

compressing the data line bytes embedded with the valid integrity value;

encrypting the compressed data line bytes embedded with the valid integrity value, using the selected at least one integrity technique; and writing to the location in the memory identified by the data line physical address: the valid integrity value to the key domain selector; the data line physical address; and the encrypted and compressed data line bytes embedded with the valid integrity value.

25. The method of claim 22, further comprising:

assigning the flushed at least one cache line to the data line physical address;

evaluating an integrity line address location first write status for at least the integrity line address location identified by the data line physical address; and initializing the integrity line address location of the plurality of integrity line address locations in the memory, responsive to the integrity line address location first write status evaluation.

* * * * *